United States Patent
Taniuchi

(10) Patent No.: US 8,437,647 B2
(45) Date of Patent: May 7, 2013

(54) IMAGE FORMING APPARATUS AND METHOD OF GIVING ALARM OF CONSUMABLE SUPPLY NEAR-END STATE IN IMAGE FORMING APPARATUS

(75) Inventor: Toshiyuki Taniuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 271 days.

(21) Appl. No.: 12/909,531

(22) Filed: Oct. 21, 2010

(65) Prior Publication Data
US 2011/0116815 A1 May 19, 2011

(30) Foreign Application Priority Data
Oct. 27, 2009 (JP) .................................. 2009-246339

(51) Int. Cl.
G03G 15/00 (2006.01)
G03G 15/08 (2006.01)

(52) U.S. Cl.
USPC .................................. 399/24; 399/23; 399/27

(58) Field of Classification Search .................... 399/23, 399/24, 28
See application file for complete search history.

(56) References Cited

U.S. PATENT DOCUMENTS

| | | | | |
|---|---|---|---|---|
| 3,717,408 A | * | 2/1973 | Radin et al. | 399/217 |
| 5,797,060 A | * | 8/1998 | Thompson | 399/25 |
| 6,859,634 B2 | * | 2/2005 | Itoh et al. | 399/258 |
| 6,925,268 B2 | * | 8/2005 | Dougherty et al. | 399/27 |
| 2003/0035656 A1 | | 2/2003 | Yamamoto et al. | |

FOREIGN PATENT DOCUMENTS

| | | |
|---|---|---|
| JP | 2000-148433 | 5/2000 |
| JP | 2001-117441 A | 4/2001 |
| JP | 2005-062715 A | 3/2005 |
| JP | 2005-274811 A | 10/2005 |
| JP | 2006-194922 A | 7/2006 |

* cited by examiner

*Primary Examiner* — David Gray
*Assistant Examiner* — Gregory H Curran
(74) *Attorney, Agent, or Firm* — Edwards Wildman Palmer LLP; David G. Conlin; David A. Tucker

(57) ABSTRACT

An image forming apparatus includes: an image forming unit; a toner bottle and a paper feed tray; sensors rendered operable immediately after the image forming apparatus is powered on, outputting detection signals that assume different values depending on whether remaining amount of toner or recording paper is lower than a prescribed value; a main control unit, rendered operable after a prescribed activating process after power-on of the image forming apparatus, for controlling the image forming unit; and an alarm device including an LED that is turned on to give an alarm if any consumable supply such as toner is in a near end state, in response to an output from the sensors.

11 Claims, 14 Drawing Sheets

IMAGE FORMING APPARATUS AND METHOD OF GIVING ALARM OF CONSUMABLE SUPPLY NEAR-END STATE IN IMAGE FORMING APPARATUS

CROSS-REFERENCE TO RELATED APPLICATION

This nonprovisional application claims priority under 35 U.S.C. §119(a) on Patent Application No. 2009-246339 filed in Japan on Oct. 27, 2009, the entire contents of which are hereby incorporated by reference.

BACKGROUND OF THE INVENTION

1. Field of the Invention

The present invention relates to an image forming apparatus using an electrophotographic system having a copy function of scanning a document and printing the scanned image on a sheet of recording paper. More specifically, the present invention relates to an image forming apparatus enabling immediate replenishment of consumable supply when the remaining amount of the consumable supply used for image formation is detected to be low or the consumable supply is detected to be used up, so that the time period in which the apparatus is inoperable can be made shorter.

2. Description of the Background Art

An image forming apparatus having the copy function scans a document to form image data, and on a recording medium such as plain paper or an OHP, forms an image of the scanned document. Considering the speed of image formation, image quality and cost, the electrophotographic system is often used in the image forming apparatus. The number of apparatuses having a plurality of basic functions (operation modes) such as a facsimile function (hereinafter "facsimile" may also be denoted as FAX or fax), a network-supported printer function and a scanner function in addition to the copy function, such as MFPs (multi-function peripherals), is increasing.

In such an electrophotographic MFP, when an image is formed on a sheet of recording paper, toner is consumed (for a monochrome MFP, monochrome toner, and for a color MFP, toner of four colors, for example, C (cyan), M (magenta), Y (yellow) and K (black)). At the same time, recording paper is also consumed. If any of such consumable supplies is used up, the apparatus fails to operate. Therefore, it is necessary to detect that the consumable supplies are used up (referred to as "end state") or the remaining amount of consumable supplied becomes lower than a prescribed amount (referred to as "near end state"), and to maintain the amount of consumable supplies to be always higher than the prescribed amount.

For this purpose, conventionally, sensors for detecting remaining amounts of consumable supplies are provided at various portions of the MFP, and when any of the consumable supplies attains to the near end state or end state, an alarm is given to the user, urging replenishment. In response to the alarm, the user can replenish the consumable supply ahead of time. As long as the user responds to the alarm appropriately, the image forming apparatus can continuously execute the image forming process. If the user fails to replenish the consumable supply and the consumable supply attains to the end state, the image forming apparatus cannot execute the image forming operation.

Both in the near end state and in the end state (hereinafter both states will be simply referred to as "near end state" and in the present embodiment, the near end state encompasses the end state), it is necessary for the user to stop the operation of image forming apparatus, before replenishing the consumable supply. Specifically, it is necessary for the user to stop the operation of image forming apparatus, and to exchange a used toner bottle in the image forming apparatus with a new toner bottle, or to draw out a paper feed cassette and load sheets of recording paper. During this period, the image forming apparatus cannot operate.

It is often the case that such an MFP is connected to a network and to a public line. As a result, the MFP comes to be shared by a plurality of users at various different places. Since the users request printing at different timings, the MFP is kept powered-on for a long period of time and, therefore; it is desired to reduce power consumption. If the MFP has the facsimile function, it is common to have the main power of MFP kept on all day, including night time and holidays. Thus, the need for reducing power consumption is increasing.

From the reasons described above, it is a common practice to turn off the power or to automatically change the state of MFP to an energy saving mode in which the power consumption is reduced, if a prescribed time period passes without any request for operation in the MFP with the main power on. Typically, power supply to some modules is stopped in the energy saving mode. Generally, the energy saving mode is cancelled when the user operates a key to start printing or copying, or when a print request is received through the network.

In the conventional MFP, however, transition to the energy saving mode is prevented if an alarm is being given to the user that any consumable supply, such as the sheet of recording paper or the toner, is in the near end or end state. The reason for this is that replenishment of consumable supply as soon as possible is desired. By way of example, if there is a display alarming the user that the sheet of recording paper is used up, the MFP does not enter the energy saving mode. In such a case, if the consumable supply is not replenished by some cause or other, transition to the energy saving mode of the MFP never takes place. As a result, power consumption of the MFP undesirably increases.

In consideration of such a problem, Japanese Patent Laying-Open No. 2006-194922 (hereinafter referred to as "'922 Reference") discloses an electronic device that enters the energy saving mode in response to a request to make a transition to the energy saving mode, even if there is any factor that causes an alarm.

The electronic device disclosed in '922 Reference has the energy saving mode in which the power consumption is reduced in the standby state, as one of its operation modes. If there is any cause of alarm in the electronic device, for example, if the sheet of paper is used up, the toner is used up or a paper jam occurs in the normal operation mode, an alarm is displayed on an operation display unit. Even when an alarm is displayed on the operation display unit, the electronic device automatically enters the energy saving mode if it receives an operation to enter the energy mode by an operator or if a prescribed time period passes without any operation. The electronic device has an LED that lights green when it is in the energy saving mode, and an LED that lights red when there is any cause of alarm in the energy saving mode. Even though the electronic device is in the energy saving mode and the generally used operation panel is not is operation, the user can recognize that there is some cause of alarm if the LED lights red.

According to '922 Reference, it is possible to reduce power consumption without impairing the operability of the electronic device. By way of example, even when the device enters the energy saving mode with the toner in the end state, it is possible to give an alarm to the user.

The technique described in '922 Reference, however, still has a room for improvement. Specifically, even if the technique of '922 Reference is adopted, it is still necessary to stop the operation of the electronic device in order to replenish the consumable supply. For the time period required for replenishing the consumable supply, the electronic device cannot execute any process that uses the consumable supply. While the electronic device is powered on, it is desirable to make as long as possible the time in which electronic device is usable. Such a problem cannot be solved by the technique disclosed in '922 Reference.

SUMMARY OF THE INVENTION

Therefore, it is desirable to provide an image forming apparatus in which, while the image forming apparatus is powered on, the time period in which the image forming apparatus is inoperable because of replenishment of consumable supply can be made shorter.

According to the first aspect, the present invention provides an image forming apparatus, including: an image forming unit; a container member containing a consumable supply used by the image forming unit for forming an image; a signal output device rendered operable immediately after power-on of the image forming apparatus, outputting a detection signal selectively assuming first and second values depending on whether remaining amount of the consumable supply contained in the container member is lower than a prescribed value; a main control unit rendered operable after a prescribed activating process after power-on of the image forming apparatus, for controlling the image forming unit; and an alarm device, connected to receive the detection signal, capable of assuming a first state indicating an alarm and a second state not indicating an alarm, rendered operable before completion of the activating process of the main control unit, and assuming the first state in response to the detection signal having the first value.

If the remaining amount of a consumable supply is lower than a prescribed value at the time of activation of the image forming apparatus, the alarm device that becomes operable earlier than the main control unit gives an alarm. Therefore, it becomes possible to start or finish replenishment of the consumable supply before image formation by the image forming unit becomes possible. The image forming unit becomes operable earlier than when replenishment starts after the main control unit becomes operable and, therefore, the usable time of the image forming unit can be made longer.

Preferably, the signal output device includes a sensor rendered operable immediately after power-on of the image forming apparatus, provided in relation to the container member for detecting remaining amount of the consumable supply contained in the container member, and selectively assuming the first and second values depending on whether the remaining amount is lower than the prescribed value.

More preferably, the image forming apparatus further includes an operation device connected to the main control unit, receiving an operation by a user and applying an operation signal to the main control unit. The operation device has a display device displaying information based on a display signal applied from the main control unit. The main control unit displays a message giving an alarm to the user urging replenishment of the consumable supply on the display device, in response to the detection signal having the first value when the main control unit is operable.

More preferably, the alarm device includes a light emitting device different from the display device, turned on or off in response to a control signal, and a sub control device connected to receive the detection signal, rendered operable before completion of the activating process of the main control unit after power-on of the image forming apparatus, for turning on or off the light emitting device in response to the detection signal having the first value or the second value, respectively.

Preferably, the signal output device includes: a sensor rendered operable immediately after power-on of the image forming apparatus, provided in relation to the container member, for detecting remaining amount of the consumable supply contained in the container member, and selectively assuming the first and second values depending on whether the remaining amount is lower than the prescribed value or not; a storage storing an output of the sensor immediately before power-off of the image forming apparatus, capable of retaining memory even when the image forming apparatus is powered off; and a reading device reading, after the image forming apparatus is powered on, the output of the sensor stored in the storage, and applying the read output as the detection signal to the alarm device.

According to a second aspect, the present invention provides a method of giving an alarm of near end state of a consumable supply in an image forming apparatus. The image forming apparatus includes: an image forming unit; a container member containing a consumable supply used by the image forming unit for forming an image; a signal output device rendered operable immediately after power-on of the image forming apparatus, outputting a detection signal selectively assuming first and second values depending on whether remaining amount of the consumable supply contained in the container member is lower than a prescribed value; a main control unit rendered operable after a prescribed activating process after power-on of the image forming apparatus, for controlling the image forming unit; and an alarm device, connected to receive the detection signal, capable of assuming a first state indicating an alarm and a second state not indicating an alarm, rendered operable before completion of the activating process of the main control unit, and assuming the first state in response to the detection signal having the first value. The method includes the steps of: after power-on of the image forming apparatus, activating both the main control unit and the alarm device; after power-on of the image forming apparatus, the alarm device reading an output of the signal output device; and after power-on of the image forming apparatus, setting the alarm device to the first state, in response to the detection signal having the first value.

Preferably, the signal output device includes: a sensor rendered operable immediately after power-on of the image forming apparatus, provided in relation to the container member, for detecting remaining amount of the consumable supply contained in the container member, and selectively assuming the first and second values depending on whether the remaining amount is lower than the prescribed value or not; a storage storing an output of the sensor immediately before power-off of the image forming apparatus, capable of retaining memory even when the image forming apparatus is powered off; and a reading device reading, after the image forming apparatus is powered on, the output of the sensor stored in the storage, and applying the read output as the detection signal to the alarm device. The step of reading includes the steps of: in response to an instruction to turn off the power of the image forming apparatus, turning off the power of the image forming apparatus after storing the output of the sensor in the storage; and after power-on of the image forming apparatus, the reading device reading the output of the sensor stored in the storage and applying it as the detection signal to the alarm device.

In the image forming apparatus according to the present invention, that the remaining amount of a consumable supply (such as recording paper or toner) is low (near end state) or exhausted (end state) is informed of the user while the image forming system is being activated, to enable replenishment during system activation. Thus, an image can be formed as soon as the system is activated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
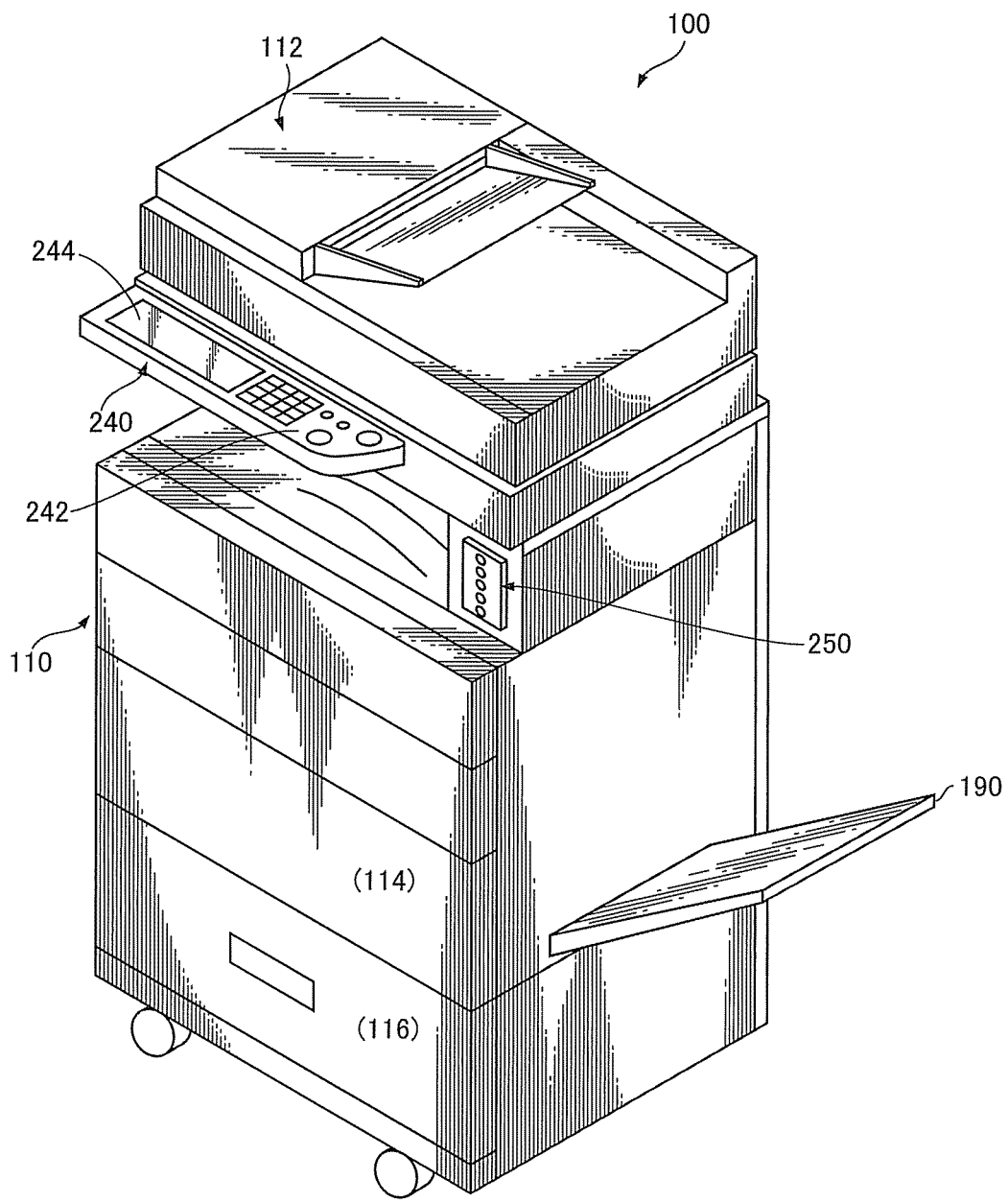
FIG. 1 is a perspective view of an MFP as an image forming apparatus in accordance with a first embodiment of the present invention.

In the following description, the same components are denoted by the same reference characters. Their functions and names are also the same. Therefore, detailed description thereof will not be repeated.

In the following description and in the drawings, the image forming apparatus in accordance with the present invention is described as a tandem type full-color MFP. The present invention, however, is not limited to such an embodiment. The image forming apparatus may be a full-color apparatus of a different type (for example, 4-cycle type), or it may be a monochrome type apparatus.

First, a basic idea of how the usable time while the power is on of the MFP is made longer in accordance with the present embodiment will be described.

Recent MFPs have many functions and to realize such functions, most MFPs have control units that execute complicated processes. Typically, an ASIC (Application Specific Integrated Circuit) is used as such a control unit. The ASIC refers to an integrated circuit having circuits of a plurality of functions integrated as one circuitry. Since the ASIC controls a plurality of functional units in the MFP, it must execute processes of many sequences to set the functional units to prescribed states before the system is fully activated. Such sequences include, for example, a power supply sequence and a reset sequence. In order to execute processes of such sequences, generally, the MFP requires time of a few minutes until the system activation is completed and the MFP becomes operable. In the following, the time will be referred to as system activation time.

Assume that the power of MFP is off. A user who wishes to have a document copied by the MFP turns on the main power of MFP. Then an activation sequence of the MFP is executed by the ASIC. Therefore, the MFP does not immediately become operable. The user must wait for the system activation time, until the system activation of MFP is completed.

Assume that a consumable supply of the MFP is in the near end state at the time of system activation. Since the system is not yet activated, the MFP cannot detect the near end state, and even if it could detect, it cannot inform the user of the state. The MFP cannot inform the user that the consumable supply is in the near end state until the system is activated. Receiving the information, the user becomes aware that the consumable supply must be replenished, and takes necessary steps. After all, to have the document copied by the MFP that has been off, it takes the system activation time as mentioned above and, in addition, the time for replenishing the consumable supply.

The technique described in '922 Reference is on the premise that the system of electronic device is on. Therefore, such a problem cannot be solved even if the technique of '922 Reference is introduced.

In contrast, in the MFP in accordance with the present embodiment, separate from the ASIC described above, an alarm unit is provided, which detects that a consumable supply of the MFP is in the near end state and gives an alarm to the user separately from the operation device on the main body of MFP. The alarm unit has far shorter activation time than the ASIC. As a result, before the MFP system activation is completed, an alarm that the consumable supply is in the near end state can be given to the user by the indication of the alarm unit. In response to the alarm, the user can start replenishment of the consumable supply while the MFP system is being activated. If replenishment is completed within the system activation time, the MFP can be usable as soon as the MFP system activation is completed. Even if replenishment is not completed within the system activation time, the MFP becomes usable as soon as the replenishment ends after the MFP system activation. Therefore, the usable time of MFP can be made longer.

<<First Embodiment>>

[Image Forming Apparatus (Hardware)]

The image forming apparatus in accordance with the first embodiment of the present invention is a so-called multifunction peripheral (MFP), and has a copy function (copy mode), a facsimile transmission/reception function (facsimile mode), a printer function (printer mode) and a scanner function (scanner mode) as the operation modes.

In the following, the internal structure and the operation of MFP 100 in accordance with the present embodiment will be briefly described in connection with the function of forming an image on a sheet of recording paper (used in the copy mode, facsimile reception mode and the printer mode), with reference to FIGS. 1 to 4. In the present specification, "copy" refers to a process of printing on a sheet of recording paper based on image data obtained by scanning a document. "Image formation" refers not only to the copying process but also the process for printing an image received by the facsimile function on a sheet of recording paper and the process for printing an image received from a printer on a sheet of recording paper.

MFP 100 forms an image of a single color or multi colors on a prescribed sheet of recording paper based on image data received from an information processing apparatus such as a computer through the network line, or based on scan data of a document scanned by MFP 100.

Figure 2:
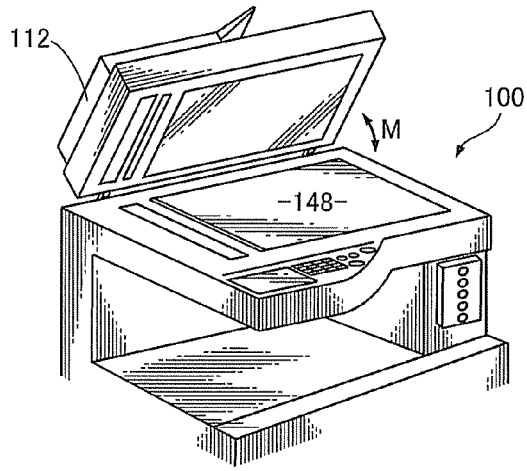
FIG. 2 is a perspective view showing a manner how an automatic document feeder 112 of the MFP shown in FIG. 1 is opened/closed.

Referring to FIGS. 1 and 2, briefly stated, MFP 100 includes a main body 110, an automatic document feeder 112 provided at an upper portion of main body 110, and an image forming unit 114 and a recording paper feeding unit 116, provided inside main body 110, though not specifically shown in FIG. 1. On the right side surface of main body 110, a manual feed cassette 190 is provided. Automatic document feeder 112 is used in the copy mode or in the scan mode. As shown in FIG. 2, on an upper surface of main body 110, a platen 148 formed of a transparent glass is provided, on which a document is placed.

Automatic document feeder 112 is attached to main body 110 to cover platen 148. Automatic document feeder 112 automatically feeds the document to platen 148. As shown in FIG. 2, automatic document feeder is attached to main body 110 to be rotatable in the direction of an arrow M shown in FIG. 2, and it can open platen 148. When platen 148 is opened, it is possible to place a document manually on platen 148.

On the front surface on the upper right side of main body 110 of MFP 100, an alarm unit 250 is provided, which gives an alarm to the user related to the near end state of consumable supplies. In the present embodiment, alarm unit 250 includes five LEDs (Light Emitting Diodes). The LEDs are turned on or off in accordance with the control as will be described later.

On the front surface of the upper part of the front side of main body 110 of MFP 100, an operation device 240 is provided, which receives user operation and outputs an operation signal. Operation device 240 includes a plate-shaped operation unit 242 arranged on the right side on a surface of operation device 240, provided with hardware keys including ten keys and various other operation buttons; and a display unit 244 formed of a small, touch-panel liquid crystal display device, arranged on the central to the left side of operation device 240. Operation unit 242 and display unit 244 are held in one housing, and operation device 240 is formed integrally to be one piece. Display unit 244 displays information based on a display signal applied from the outside.

On display unit 244 of operation device 240, the state of operation of MFP 100, a menu allowing the user to select a desired function and the like are displayed. On a display area of display unit 244, selection buttons and the like are displayed. When a portion where the selection button is displayed is pressed by the user's finger, the pressed position is detected by the touch panel of display unit 244. By comparing the display position of the selection button and the position where the touch panel is pressed using a program, the user instruction is detected. In accordance with the detected user instruction, function setting and operation of MFP 100 are realized.

Figure 3:
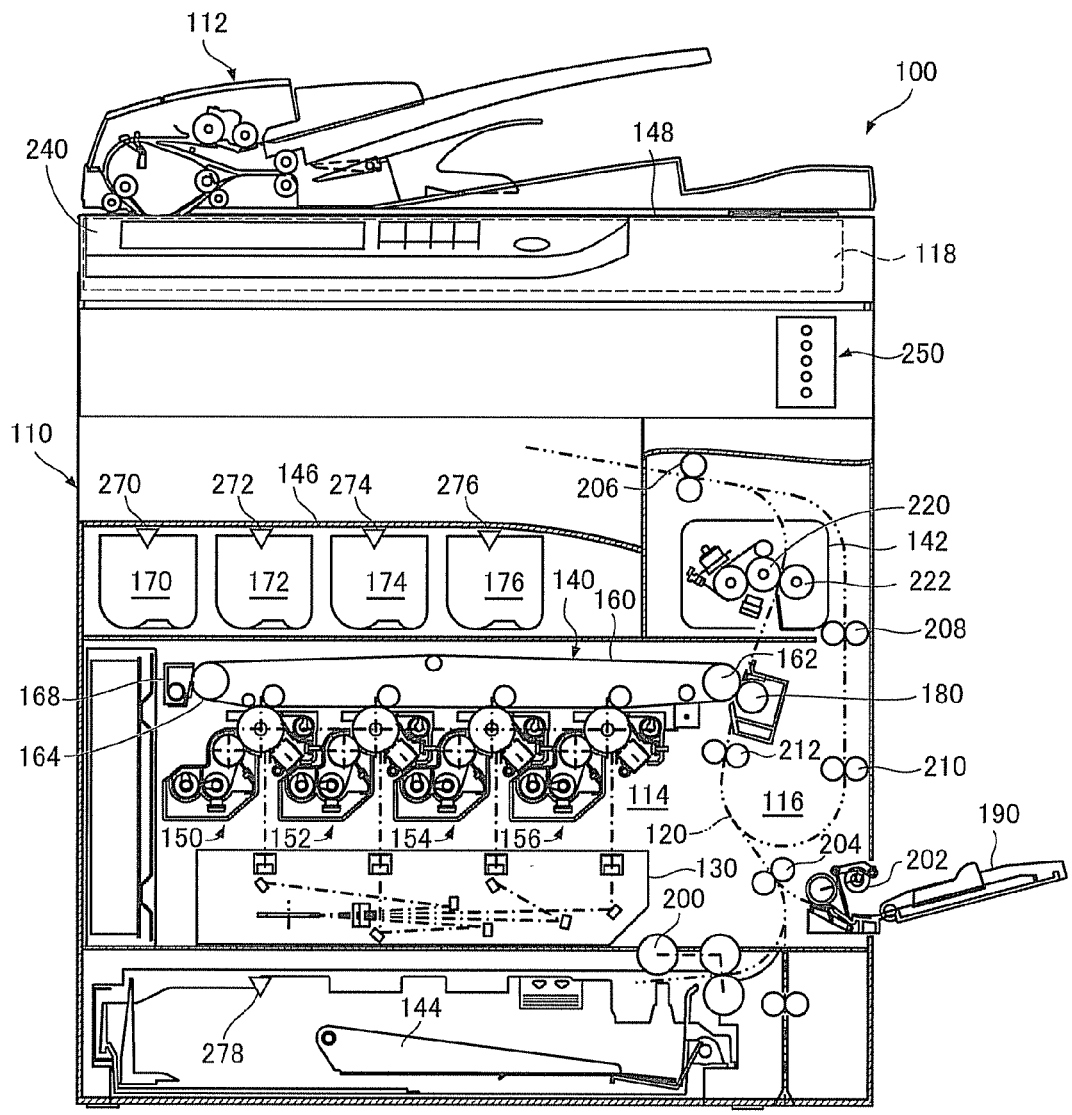
FIG. 3 is a partial cross-section showing an internal structure of the image forming apparatus shown in FIGS. 1 and 2.

Referring to FIG. 3, at an upper portion in main body 110, immediately below platen 148, a document reading unit 118 is provided, which reads the document placed on platen 148 and outputs image data.

In main body 110, various units forming the image forming unit are arranged. Image forming unit 114 includes: four image stations 150, 152, 154 and 156 each having a photoreceptor drum, for forming four images of black (K), cyan (C), magenta (M) and yellow (Y) on the photoreceptors, respectively; an exposure unit 130 for forming latent images of respective colors on the surfaces of photoreceptor drums in image stations 150, 152, 154 and 156, respectively, based on the image data; an intermediate transfer belt unit 140 arranged above image stations 150, 152, 154 and 156, for transferring the images of respective colors formed by these stations to a sheet of recording paper in an overlapping manner; and a fixing unit 142 for fixing the transferred images on the sheet of recording paper.

Figure 4:
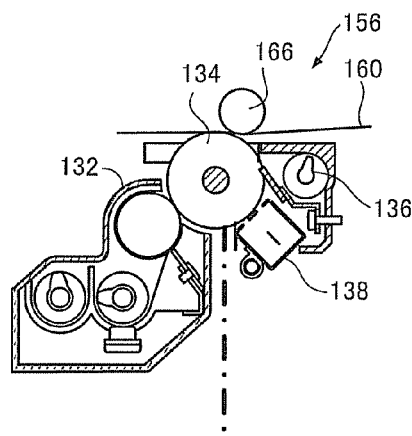
FIG. 4 is an enlarged view of an image station in the MFP shown in FIG. 3.

The image data processed in MFP 100 is data representing a color image using black (K), cyan (C), magenta (M) and yellow (Y). Image stations 150, 152, 154 and 156 are for forming four latent images corresponding to the four colors, respectively. The stations have the same structures. Referring to FIG. 4, by way of example, image station 156 includes: a photoreceptor drum 134, on which surface a latent image based on the image data is formed; a charger 138 provided close to the surface of photoreceptor drum 134, for uniformly charging the surface of photoreceptor drum 134 to a prescribed potential; a developer 132 for developing the latent image formed on the surface of photoreceptor drum 134 by the toner; and a cleaner unit 136 for removing and recovering the toner left on the surface of photoreceptor drum 134, after the developed image on the photoreceptor drum 134 is transferred to the intermediate transfer belt, which will be described later.

Exposure unit 130 is a laser scanning unit (LSU) including a laser emitting unit portion and a reflection mirror. Exposure unit 130 includes: a polygon mirror scanning laser beams corresponding to respective colors emitted by the laser emitting portion; and optical elements such as lenses and mirrors for guiding the laser beams of respective colors reflected by the polygon mirror to photoreceptor drums 134 of respective image stations.

Exposure unit 130 exposes the charged photoreceptor drum 134 of each image station in accordance with each color of the input image. As a result, electrostatic latent images in accordance with image data of respective colors are formed on the surfaces of photoreceptor drums 134 of respective image stations.

Above photoreceptor drum 134, an intermediate transfer belt unit 140 is arranged. Intermediate transfer belt unit 140 includes: an intermediate transfer belt 160; an intermediate transfer belt driving roller 162; an intermediate transfer belt driven roller 164; four intermediate transfer rollers 166 provided corresponding to four colors C, M, Y and K; and an intermediate transfer belt cleaning unit 168. Intermediate transfer belt driving roller 162, intermediate transfer belt driven roller 164, and intermediate transfer rollers 166 are for driving and rotating intermediate transfer belt 160 suspended therearound. Intermediate transfer rollers 166 apply transfer bias for transferring the toner image on photoreceptor drums 134 to intermediate transfer belt 160.

Intermediate transfer belt 160 is provided to be in contact with four photoreceptor drums 134. By transferring the toner images of respective colors formed on photoreceptor drums 134 successively on intermediate transfer belt 160 in an overlapping manner, a color toner image (multi-colored toner image) is formed on intermediate transfer belt 160. Intermediate transfer belt 160 is formed as an endless belt, using a film having the thickness of about 100 μm to 150 μm.

Transfer of the toner image from photoreceptor drums 134 to intermediate transfer belt 160 is performed by intermediate transfer roller 166 that is in contact with the rear side of intermediate transfer belt 160. To intermediate transfer roller 166, high-voltage transfer bias (high voltage of a polarity (+) opposite to the charging polarity (−) of the toner) is applied, for transferring the toner image. Intermediate transfer roller 166 has, as a base, a metal shaft (for example, of stainless steel) having the diameter of 8 mm to 10 mm, with its surface covered with an electrically conductive elastic material (for example, ethylene-propylene-diene rubber, urethane foam or the like). Because of the conductive elastic material, it is possible to apply high voltage uniformly to intermediate transfer belt 160. Though a roller-shaped transfer electrode is used in the present embodiment, brush electrode or the like may also be usable.

As described above, the electrostatic latent images visualized in respective colors on respective photoreceptor drums 134 are transferred overlapped on intermediate transfer belt 160. The overlapped image information is transferred to a sheet of paper by means of transfer roller 180, which will be described later, arranged at a position where the sheet of paper is brought into contact with intermediate transfer belt 160, as intermediate transfer belt 160 rotates.

At this time, intermediate transfer belt 160 and transfer roller 180 are brought into pressure contact with each other with a prescribed nip, and a voltage is applied to transfer roller 180 to transfer the toner to the sheet of paper. Here, the voltage is a high voltage of a polarity (+) opposite to the charging polarity (−) of toner. Further, in order to constantly maintain the nip mentioned above, one of transfer roller 180 and intermediate transfer belt driving roller 162 is formed of hard material (such as metal) and the other is formed of soft material such as an elastic roller. The soft material may include an elastic rubber roller, a foamable resin roller or the like.

The toner not transferred to the sheet of recording paper but left on intermediate transfer belt 160 causes mixture of toner colors in the subsequent process steps. Therefore, such residual toner is removed and recovered by intermediate transfer belt cleaning unit 168. Intermediate transfer belt cleaning unit 168 is provided with a cleaning blade to be in contact with intermediate transfer belt 160. Intermediate transfer belt 160 is supported by intermediate transfer belt driven roller 164 from its rear side at a portion to be in contact with the cleaning blade.

Recording paper feeding unit 116 includes, in addition to manual feed cassette 190 described above, a paper feed cassette 144 provided at a lower portion of the main body, and a discharge tray 146 provided below platen 148 at an upper portion of main body 110, to which a sheet of recording paper after image formation is discharged.

Paper feed cassette 144 is a tray for storing sheets of recording paper used for forming images, and it is provided below exposure unit 130 in main body 110. Sheets used for image forming may also be placed on a manual feed cassette 190. Paper discharge tray 146 is for stacking printed sheets in a face-down manner.

Recording paper feeding unit 116 includes a substantially vertical paper feed path 120 formed in main body 110, for feeding a sheet of recording paper from paper feed cassette 144 or manual feed cassette 190 through transfer roller 180 and fixing unit 142 to discharge tray 146. Recording paper feeding unit 116 further includes a pick-up roller 200, a pick-up roller 202, a plurality of conveyer rollers 204 to 210, a register roller 212, transfer roller 180 and fixing unit 142, provided in the vicinity of paper feed path 120 from paper feed cassette 144 or manual feed cassette 190 to paper discharge tray 146.

Conveyer rollers 204 to 210 are small rollers for promoting and assisting feeding of sheets, and a number of such conveyer rollers are provided along the paper feed path 120. Pick-up roller 200 is provided close to an end of paper feed cassette 144, and it picks up sheets one by one from paper feed cassette 144 and supplies the sheets to paper feed path 120. Similarly, pick-up roller 202 is provided close to an end of manual feed cassette 190, and it picks up sheets one by one from manual feed cassette 190 and supplies the sheets to paper feed path 120.

Register roller 212 is for temporarily holding a sheet that is being fed on paper feed path 120. Register roller 212 has a function of feeding the sheet to transfer roller 180 at a timing to have an end of toner image on photoreceptor drum 134 aligned with an end of the sheet.

Fixing unit 142 includes a heat roller 220 and a pressure roller 222. Heat roller 220 and pressure roller 222 are adapted to rotate with a sheet positioned therebetween. Heat roller 220 is set to be a prescribed fixing temperature based on a signal from a temperature detector, not shown. Pressure roller 222 and heat roller 220 attain heat-and-pressure contact of the toner to the sheet of recording paper, so that the multi-colored toner image that has been transferred to the sheet is melt and pressed, and the image is thermally fixed on the sheet.

A heater, such as a halogen heater, not shown, is provided in fixing unit 142, for heating heat roller 220.

The paper feed path is as follows. As described above, in MFP 100, paper feed cassette 144 and manual feed cassette 190 for storing sheets of recording paper are provided in advance. In order to feed sheets of recording paper from paper feed cassette 144 or manual feed cassette 190, pick-up roller 200 or pick-up roller 202 is arranged, whereby the sheets are guided one by one to the paper feed path.

The sheet fed from paper feed cassette 144 or manual feed cassette 190 is fed to register roller 212 by conveyer roller 204 on paper feed path 120. The sheet of recording paper is then fed to transfer roller 180 at a timing to have the tip end of sheet aligned with the tip end of image information on intermediate transfer belt 160, and the image is transferred from intermediate transfer belt 160 to the sheet of recording paper. Thereafter, the sheet of recording paper passes through fixing unit 142, and the not-yet-fixed toner on the sheet of recording paper is melt and fixed by heat, and then, the sheet is discharged through subsequent conveyer roller 206 to discharge tray 146.

The paper feed path described above is followed when one-sided printing on a sheet is required. When double-sided printing is required, the sheet of recording paper is fed on the following paper feed path. When image formation on one side ends, the sheet passes through fixing unit 142 as described above. When the rear end of the sheet of recording paper is held by the last conveyer roller 206, conveyer roller 206 rotates in reverse direction. Thus, the sheet is guided to conveyer roller 208, 210. Thereafter, the sheet is fed to register roller 212 and further to transfer roller 180. Here, in the similar manner as image formation on one side, an image is formed on the rear surface of the sheet. Thereafter, the sheet is discharged to discharge tray 146.

Figure 5:
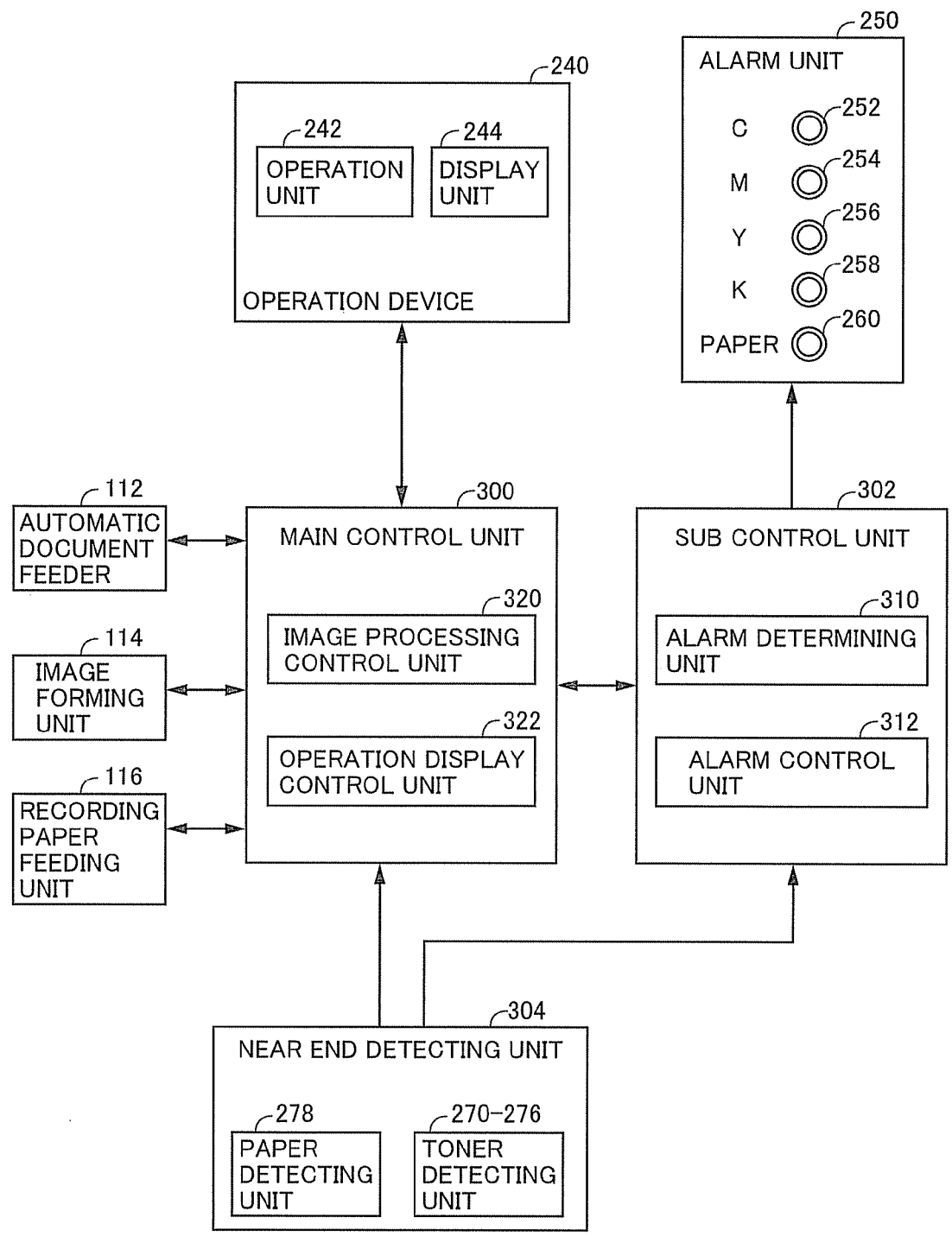
FIG. 5 is a control block diagram of the MFP shown in FIG. 1.

The process for feeding the sheet of recording paper as described above is controlled by the control unit (main control unit 300 of FIG. 5) controlling the paper feed unit (recording paper feeding unit 116 of FIG. 5).

Further, MFP 100 in accordance with the present embodiment includes, as shown in FIGS. 1 to 3, an alarm unit 250 giving an alarm to the user that a consumable supply is in the near end state, if the near end state is detected before MFP 100 becomes operable at the time of activation of MFP 100.

Once MFP 100 becomes operable, the alarm related to the near end state of consumable supply or the like is displayed on operation device 240 by main control unit 300, as will be described later.

For giving an alarm related to the consumable supply to the user, MFP 100 in accordance with the present embodiment includes toner detecting units 270, 272, 274 and 276 provided corresponding to toner bottles 170, 172, 174 and 176 containing four color toners of CMYK, respectively, as well as a paper detecting unit 278, provided at positions shown in FIGS. 3 and 4. Toner detecting units 270, 272, 274 and 276 are sensors outputting a signal that assumes a prescribed value depending on whether the remaining amount of CMYK toners is in the near end state or not, respectively. Paper detecting unit 278 is provided corresponding to paper feed cassette 144, and outputs a signal that assumes a prescribed value depending on whether the remaining amount of sheets of paper is in the near end state or not. The type of sensors forming toner detecting units 270, 272, 274 and 276 and paper detecting unit 278 is not specifically limited. In the present embodiment, when the prescribed signal output from toner detecting units 270, 272, 274 and 276 and paper detecting unit 278 has the logic value 0, it means that the remaining amount of toner or the remaining amount of paper is sufficient. The output signal is not limited to the above, and a signal may be output if sufficient remaining amount is detected.

[Operation Mode of Image Forming Apparatus]

MFP 100 in accordance with the present embodiment includes, as its operation modes, copy mode, facsimile transmission/reception mode, printer mode and scanner mode. In the following, these operation modes will be described. In the exemplary image displayed on display unit 244, the facsimile transmission/reception mode and the scanner mode are shown as "fax/image transmission" and "document filing" modes, respectively.

—Copy Mode—

In the following, the copy mode will be described. In the copy mode, mainly the main body 110 operates to realize the copy function. When a document is to be automatically fed, automatic document feeder 112 operates.

A document placed on platen 148 is read as image data, by document reading unit 118. The image data is input to the control unit, and various image processing operations are done on the image data. The image forming unit having the structure as described above prints the document image represented by the image data on a sheet of recording paper.

—Facsimile Mode—

In the facsimile mode, the transmitting operation is realized mainly by document reading unit 118 and a FAX communication unit. The receiving operation is realized by the FAX communication unit and the image forming unit.

At the time of transmission, MFP 100 operates in the following manner. In MFP 100, the facsimile mode is designated. A document placed on platen 148 is read as image data, by document reading unit 118. The read image data is input to the control unit, and various image processing operations are done on the image data. The image data is output to the FAX communication unit. The FAX communication unit connects a designated transmitting side line to a designated transmission destination, converts the image data to communication data in compliance with facsimile transmission standard, and transmits the converted data to a facsimile machine on the receiving side. When the line is connected, the facsimile machine on the receiving side detects a communication request signal from the FAX communication unit of MFP 100, and transmits an acknowledgement signal. Thereafter, by way of example, the FAX communication unit of MFP 100 and the facsimile machine on the receiving side pass performance information supported by transmitting side and receiving side, determine highest possible speed of communication and method of coding/code correction of image data, and set the method of communication of modems. Then, using the image signal format in accordance with the communication method, data is transmitted from the FAX communication unit of MFP 100 to the facsimile machine on the receiving side. When transmission ends, the line is disconnected.

The receiving operation is as follows. The FAX communication unit of MFP 100 on the receiving side converts the received data to image data and passes the data to the image forming unit. The received data may be converted to image data at the image forming unit. The image forming unit forms an image on a sheet of recording paper based on the image data obtained by the conversion from the received data, in a manner similar to the operation in the copy mode described above.

—Printer Mode—

In the printer mode, the printing function is realized mainly by the operation of the image forming unit.

When MFP 100 receives print data from a computer through a network interface, not shown, the received print data is fed to the image forming unit. The image forming unit converts the print data to image data. The image forming unit forms an image on a sheet of recording paper based on the image data obtained by the conversion from the print data, in a manner similar to the operation in the copy mode described above.

—Scanner Mode—

In the scanner mode, the scanner function is realized mainly by the operation of document reading unit 118.

A document placed on platen 148 is read as image data, by document reading unit 118. The read image data is input to the control unit, and various image processing operations are done on the image data. The image data is stored in a storage (hard disk), not shown, of MFP 100, transmitted through a network interface to a computer connected to the network, or transmitted through the network interface as a file attached to an electronic mail. In the present specification, these operation modes will be referred to as "document filing," "scan-to-folder" and "scan-to-mail" modes, respectively.

[Control Block Structure of Image Forming Apparatus]

MFP 100 forms (prints, copies) an image of a scanned document, using the copy function among the functions described above provided in MFP 100. In MFP 100, when the main power switch is turned on, the system activation process takes place. After the lapse of the system activation time, MFP 100 becomes operable to form an image. If it is detected within the system activation time that any consumable supply is in the near end state, the sub control unit, which operates independently from the main control unit that is executing the system activation process, gives an alarm to the user about the consumable supply during system activation. In the following, the control block of MFP 100 including a functional block of realizing such a function of giving an alarm to the user about the consumable supply during system activation will be described.

Referring to FIG. 5, the control block of MFP 100 includes the following functional blocks. MFP 100 has functional blocks that realize general functions of the image forming apparatus. These functional blocks, however, are not directly related to the characteristics of the present embodiment and, therefore, details thereof will not be described here.

Referring to FIG. 5, in addition to operation device 240 and alarm unit 250 described above, the functional blocks of MFP 100 includes: a near end detecting unit 304, including toner detecting units 270, 272, 274 and 276 and paper detecting unit 278, for detecting the near end state of toner or paper, and each outputting a near end detection signal; main control unit 300 controlling automatic document feeder 112, image forming unit 114, recording paper feeding unit 116, operation device 240 and the like based on the output from operation device 240 and on the near end detection signal; and a sub control unit 302, which can be activated before completion of system activation by main control unit at the time of activation of MFP 100, connected to main control unit 300, responsive to reception of the near end detection signal, for giving an alarm of consumable supply to the user through alarm unit 250.

Main control unit 300 is formed, for example, by an ASIC. Sub control unit 302 is implemented, for example, by a single microchip. Therefore, sub control unit 302 can be activated in a far shorter time period than main control unit 300. The reason for this it that while main control unit 300 must execute various and many sequences, execution of such sequences is unnecessary in sub control unit 302.

When the main power switch of MFP 100 is turned on, power supply to sub control unit 302 and main control unit 300 starts simultaneously. Both execute the activation process. Activation of sub control unit 302 is completed before system activation of main control unit 300 is completed.

Sub control unit 302 includes: an alarm determining unit 310 determining, based on the output from near end detecting unit 304, whether or not any LED on alarm unit 250 is to be lit, and outputting the result of determination; and an alarm control unit 312 turning on or off any LED on alarm unit 250, based on the output from alarm determining unit 310.

In relation to the image forming process, main control unit 300 includes: an image processing control unit 320 controlling automatic document feeder 112, image forming unit 114 and recording paper feeding unit 116; and an operation display control unit 322 executing control of displaying an alarm information on display unit 244 of operation device 240, for giving an alarm related to consumable supply to the user.

Toner detecting units 270, 272, 274 and 276 each output a first detection signal when the remaining amount of toner attains to the near end state and outputs a second detection signal if the remaining amount attains to the end state, in relation to the four color toners of CMYK, respectively. Paper detecting unit 278 outputs a third signal when the remaining amount of recording paper in paper feed cassette 144 attains to the near end state, and outputs a fourth signal when the remaining amount attains to the end state. In the present embodiment, the first detection signal is a signal that normally has logic value 0 and assumes logic 1 when near end state is attained. The same applies to the second, third and fourth signals.

The present invention, however, is not limited to such an embodiment. An embodiment in which the first and second signals are not distinguished may be possible. An embodiment in which the third and fourth signals are not distinguished may also be possible.

Sub control unit 302 and main control unit 300 are connected to be communicable to each other. In the present embodiment, when an alarm at alarm unit 250 is cleared, sub control unit 302 transmits an image formation ready signal to main control unit 300, and when system activation is completed, main control unit 300 transmits an activation complete signal to sub control unit 302.

Alarm unit 250 controlled by sub control unit 302 includes: an LED 252 that is turned on in response to the near end state or end state of cyan (C) ink toner; an LED 254 that is turned on in response to the near end state or end state of magenta (M) ink toner; an LED 256 that is turned on in response to the near end state or end state of yellow (Y) ink toner; an LED 258 that is turned on in response to the near end state or end state of black (K) ink toner; and an LED 260 that is turned on in response to the near end state of recording paper in paper feed cassette 144. These LEDs operate with the same voltage as the driving voltage of sub control unit 302 and consume little power.

Alarm unit 250, which is controlled by sub control unit 302, is implemented by five LEDs of low power consumption and easily controllable. Different from the touch panel display on display unit 244 of operation device 240, a display driver is unnecessary. Therefore, sub control unit 302 can be implemented by a single microchip. Further, at the time of activation of sub control unit 302, various and many sequences are unnecessary. Therefore, as described above, the time necessary for activating sub control unit 302 is far shorter than the time required for main control unit 300.

Operation device 240 shown in FIG. 5 will not be described here, since description thereof has been given above with reference to FIGS. 1 to 3.

[Software Configuration of Sub Control Unit]

Sub control unit 302 shown in FIG. 5 realizes the alarm process when the power of MFP 100 is turned on, by executing the program having such a control structure as described in the following.

Figure 7:
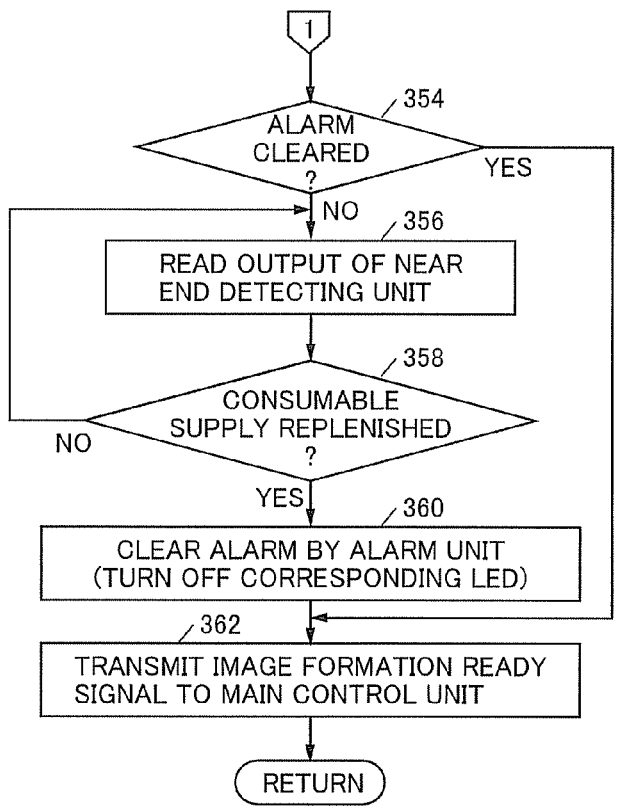
FIGS. 6 and 7 are flowcharts representing a control structure of a program executed by a sub control unit shown in FIG. 5.
Figure 6:
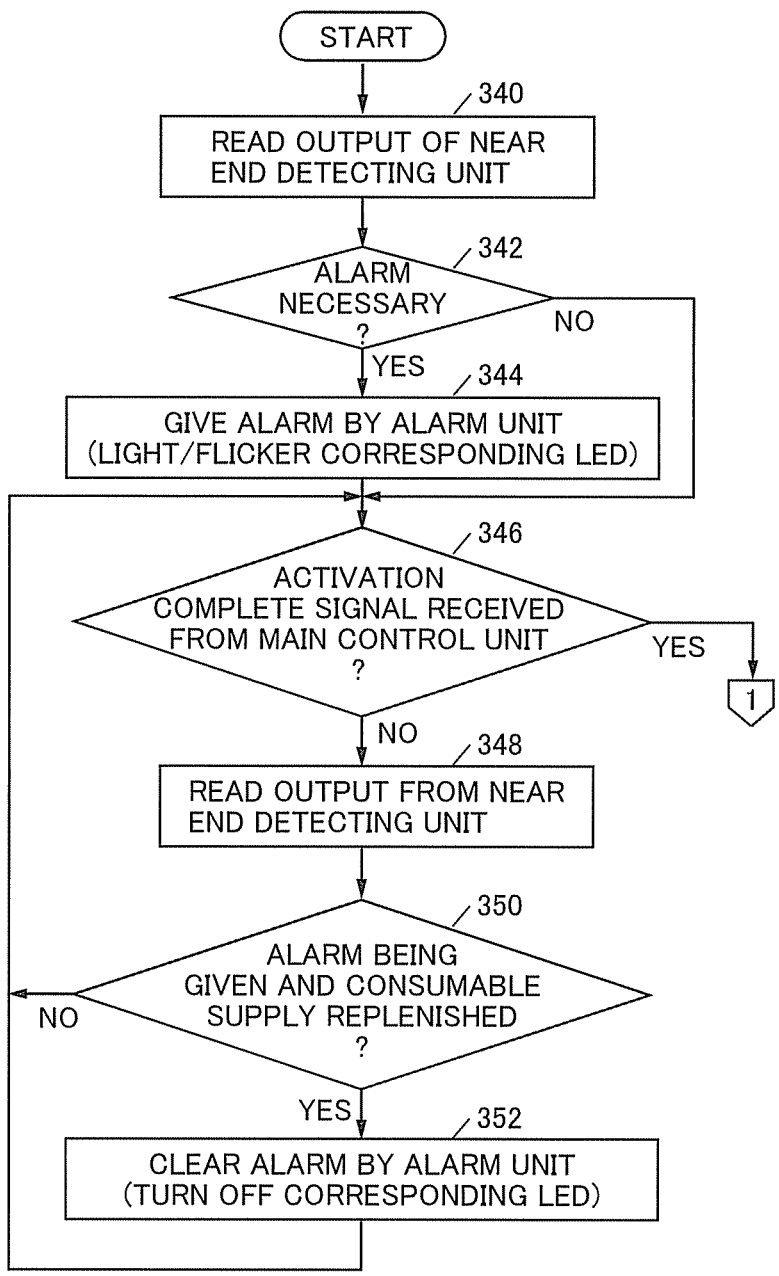

Referring to FIGS. 6 and 7, the control structure of the program executed by sub control unit 302 of MFP 100 is as follows. The program having the control structure shown in FIGS. 6 and 7 is executed from the head, by sub control unit 302 after the sub control unit 302 is activated quickly.

At step 340, sub control unit 302 reads an output from near end detecting unit 304.

At step 342, sub control unit 302 determines whether or not an alarm is necessary in relation to the near end state or the like of any consumable supply, based on the output of near end detecting unit 304. If the determination at step 342 is positive, the control proceeds to step 344. Otherwise, the control proceeds to step 346.

At step 344, sub control unit 302 gives an alarm using alarm unit 250. Specifically, sub control unit 302 turns on one or more of the LEDs 252 to 260 of alarm unit 250 that correspond to the consumable supply or supplies in the near end state.

At step 346, sub control unit 302 determines whether or not the activation complete signal indicating completion of system activation of MFP 100 has been received from main control unit 300. If the determination at step 346 is YES, the control proceeds to step 354 (FIG. 7). Otherwise, the control proceeds to step 348.

At step 348, sub control unit 302 reads the output of near end detecting unit 304. Based on the signal detected by near end detecting unit 304, sub control unit 302 determines whether or not the consumable supply has been replenished. If neither the signal indicating the near end state nor the signal indicating the end state of consumable supply is detected from near end detecting unit 304, it is determined that the consumable supply has been replenished.

At step 350, sub control unit 302 determines whether or not the alarm is being given and the consumable supply has been replenished. If it is determined that the alarm is being given and the consumable supply has been replenished (YES at step 350), the control proceeds to step 352. Otherwise (NO at step 350), the control returns to step 346.

At step 352, sub control unit 302 clears the alarm that is being given by alarm unit 250. Here, one or more of the LEDs 252 to 260 that correspond to the consumable supply or supplies of which near end or end state has been canceled are turned off. Thereafter, the control returns to step 346.

At step 354, sub control unit 302 determines whether or not all alarms given by alarm unit 250 have been cleared. If it is determined that all alarms given by alarm unit 250 have been cleared (YES at step 354), the control proceeds to step 362. Otherwise (NO at step 354), the control proceeds to step 356.

At step 356, sub control unit 302 detects a signal from near end detecting unit 304. Similar to the process at step 348, sub control unit 302 determines, based on the signal from near end detecting unit 304, whether or not the consumable supply has been replenished. If neither the signal indicating the near end state nor the signal indicating the end state of consumable supply is detected from near end detecting unit 304, sub control unit 302 determines that the consumable supply has been replenished.

At step 358, sub control unit 302 determines whether or not the consumable supply has been replenished. If it is determined that the consumable supply has been replenished (YES at step 358), the control proceeds to step 360. Otherwise (NO at step 358), the control returns to step 356.

At step 360, sub control unit 302 clears the alarm or alarms being given by alarm unit 250. Here, one or more of the LEDs 252 to 260 that correspond to the consumable supply or supplies of which near end or end state has been canceled are turned off. It is noted that all alarms are cleared by the process at step 360. Then, the control proceeds to step 362.

At step 362, sub control unit 302 transmits the image formation ready signal to main control unit 300. As described above, by the time the image formation ready signal is transmitted, all alarms that have been given by alarm unit 250 are cleared.

[Software Configuration of Main Control Unit]

Main control unit 300 shown in FIG. 5 realizes the image forming process using automatic document feeder 112, image forming unit 114 and recording paper feeding unit 116 and the alarm process related to the consumable supplies using operation device 240, by executing the programs having the software configuration as described in the following.

Figure 8:
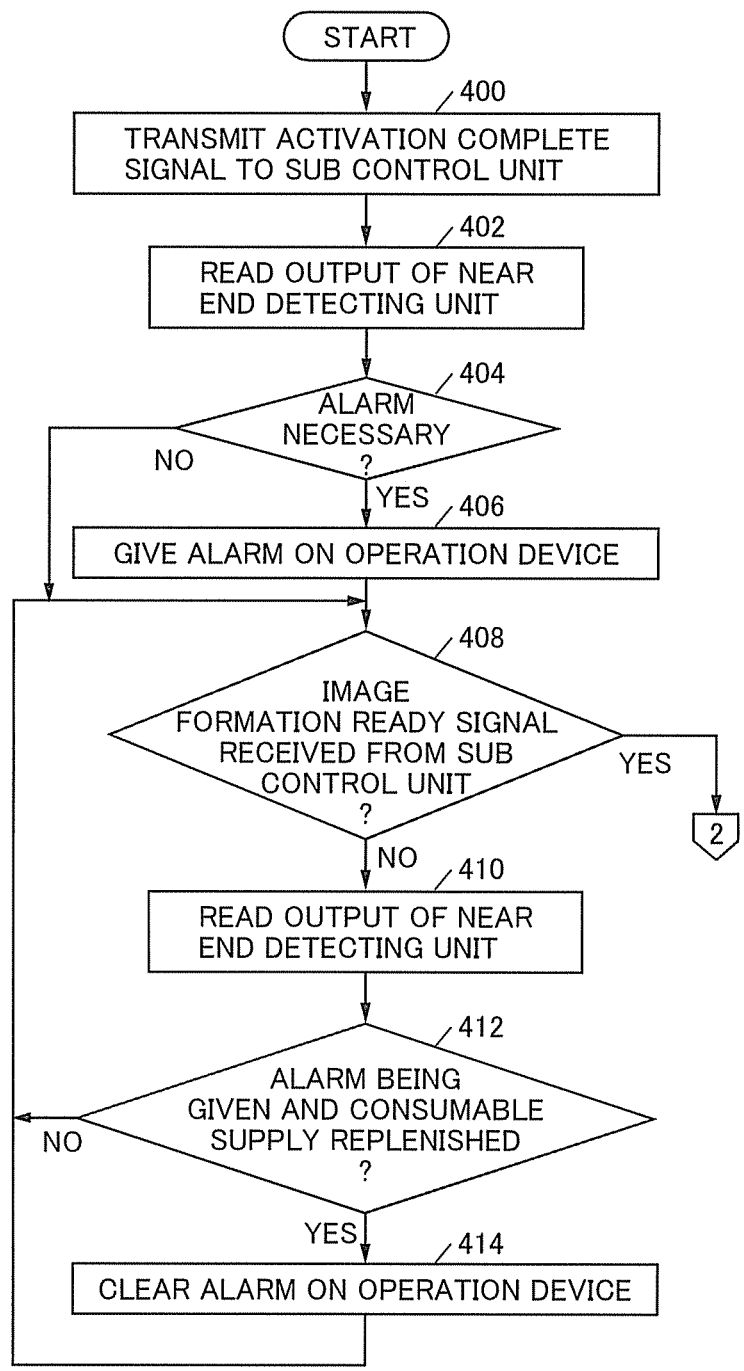
FIGS. 8 and 9 are flowcharts representing a control structure of a program executed by a main control unit shown in FIG. 5.
Figure 9:
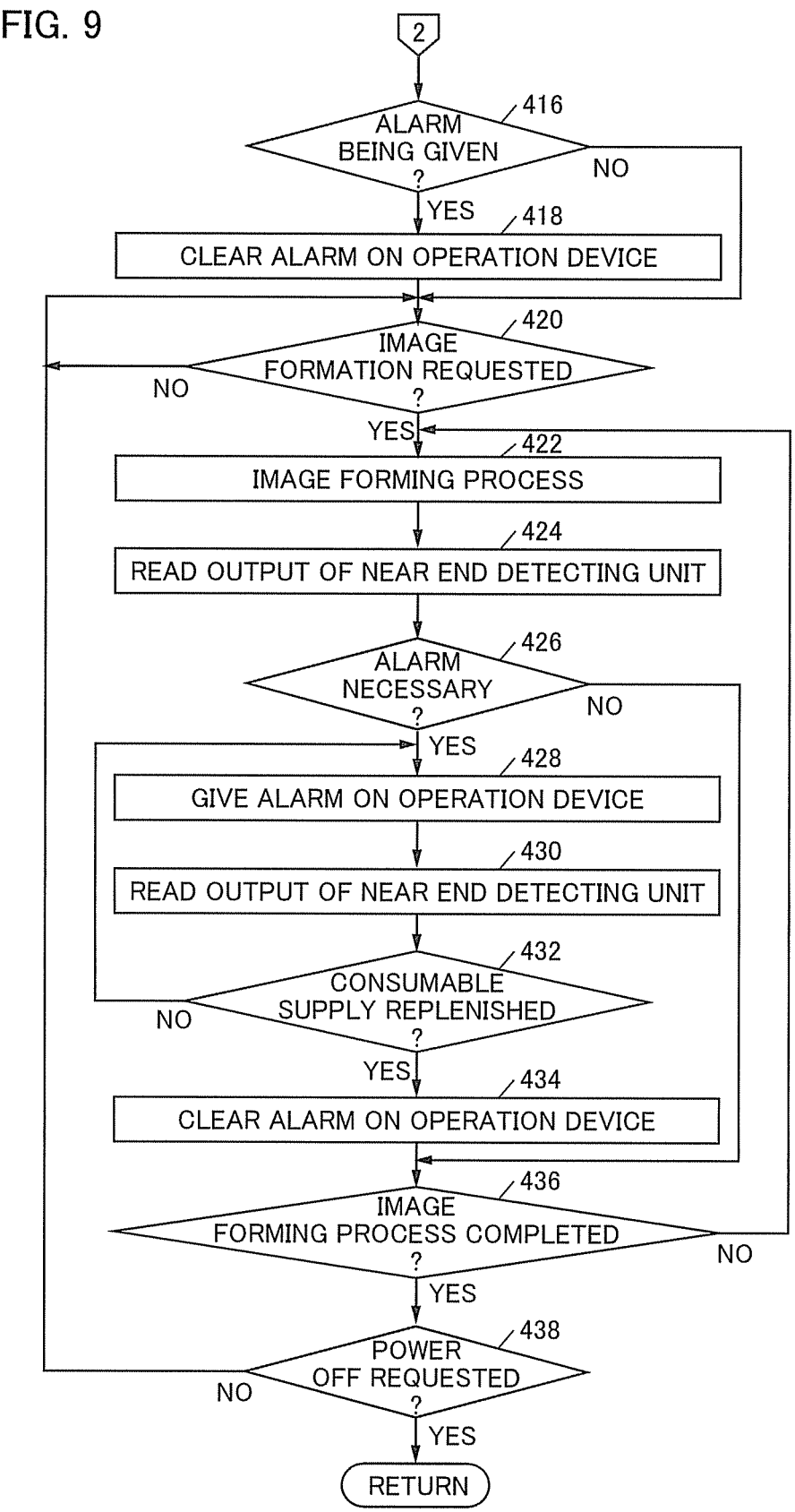

Referring to FIGS. 8 and 9, the program executed by main control unit 300 of MFP 100 has the following control structure. The flowchart shown in FIGS. 8 and 9 represents the process after the main power of MFP 100 that has been powered off is switched on by the user and main control unit 300 is fully activated (after the lapse of the system activation time).

Main control unit 300 performing overall control of MFP 100 also executes, in parallel with such a program, a program realizing general functions of the image forming apparatus (for example, the functions of realizing facsimile mode, printer mode and scanner mode as described above). The program, however, is not directly related to the characteristic portion of the present invention and, therefore, details thereof will not be described here.

At step 400, main control unit 300 of MFP 100 (hereinafter simply referred to as main control unit 300) transmits the activation complete signal to sub control unit 302.

At step 402, main control unit 300 detects a signal from near end detecting unit 304. The process at step 402 is the same as the process at step 340 executed by sub control unit 302. As described above, sub control unit 302 and main control unit 300 execute the process of step 340 and the process of step 402 in parallel (independent from each other).

At step 404, main control unit 300 determines whether or not an alarm related to consumable supply to the user is necessary. Here, main control unit 300 determines whether or not it is necessary to give an alarm related to consumable supply to the user, based on the signal detected from near end detecting unit 304. If a signal indicating that any consumable supply is in the near end or end state is detected from near end detecting unit 304, main control unit 300 determines that it is necessary to give an alarm related to the consumable supply to the user. If it is determined necessary to give an alarm related to the consumable supply to the user (YES at step 404), the control proceeds to step 406. Otherwise (NO at step 404), the control proceeds to step 408. The process at step 404 is the same as the process at step 342 executed by sub control unit 302. Sub control unit 302 and main control unit 300 execute the process of step 342 and the process of step 404 in parallel (independent from each other).

At step 406, main control unit 300 gives an alarm using operation device 240. Here, information corresponding to the consumable supply in the near end or end state is displayed on display unit 244.

At step 408, main control unit 300 determines whether or not the image formation ready signal has been received from sub control unit 302. The process corresponds to the process of step 362 described above. If it is determined that the image formation ready signal has been received from sub control unit 302 (YES at step 408), the control proceeds to step 416. Otherwise (NO at step S408), the control proceeds to step 410.

At step 410, main control unit 300 detects a signal from near end detecting unit 304. Main control unit 300 determines whether or not the consumable supply has been replenished, based on the signal detected from near end detecting unit 304. If neither the signal indicating the near end state nor the signal indicating the end state of consumable supply is detected from near end detecting unit 304, main control unit 300 determines that the consumable supply has been replenished. The control at step 410 is the same as that of step 348 executed by sub control unit 302. As described above, sub control unit 302 and main control unit 300 execute the process of step 348 and the process of step 410 in parallel (independent from each other).

At step 412, main control unit 300 determines whether or not the alarm is being given and the consumable supply has been replenished. If it is determined that the alarm is being given and the consumable supply has been replenished (YES at step 412), the control proceeds to step 414. Otherwise (NO at step 412), the control returns to step 408. The process at step 412 is the same as the process at step 350 executed by sub control unit 302. Sub control unit 302 and main control unit 300 execute the process of step 350 and the process of step 412 in parallel (independent from each other).

At step 414, main control unit 300 clears the alarm being given by operation device 240. Here, the consumable supply information corresponding to the consumable supply of which near end or end state is cancelled is erased. Thereafter, the control returns to step 408.

At step 416, main control unit 300 determines whether or not an alarm is being given. If it is determined that the alarm is being given (YES at step 416), the control proceeds to step 418. Otherwise (NO at step 416), the control proceeds to step 420.

At step 418, main control unit 300 clears the alarm being given by operation device 240. Here, the consumable supply information corresponding to the consumable supply of which near end or end state is cancelled is erased. Since sub control unit 302 has cleared all alarms at step 360 and transmitted the image formation ready signal to main control unit 300, it follows that all alarms are cleared by the process of step 418.

At step 420, main control unit 300 determines whether or not an image formation request is detected. Assume, for example, that a user who sets a document on automatic document feeder 112 selects the copy mode and presses a start key on operation unit 242 of operation device 240. Then, it is determined that the image formation request has been detected. If it is determined that the image formation request has been detected (YES at step 420), the control proceeds to step 422. Otherwise (NO at step 422), the control returns to step 420, and waits until the image formation request is determined to be detected.

At step 422, main control unit 300 executes the image forming process. By the process at step 422, the image forming process by automatic document feeder 112, image forming unit 114 and recording paper feeding unit 116, controlled by main control unit 300, starts.

At step 424, main control unit detects a signal from near end detecting unit 304. Main control unit 300 determines, based on the signal from near end detecting unit 304, whether or not replenishment of any consumable supply is necessary during image formation. If a signal indicating near end of a consumable supply or a signal indicating end of a consumable supply is detected from near end detecting unit 304, main control unit 300 determines that replenishment of the consumable supply is necessary.

At step 426, main control unit 300 determines whether or not an alarm related to consumable supply to the user is necessary. Here, main control unit 300 makes a determination based on the signal detected from near end detecting unit 304. If a signal indicating that any consumable supply is in the near end or end state is detected from near end detecting unit 304, main control unit 300 determines that it is necessary to give an alarm related to the consumable supply to the user. If it is determined necessary to give an alarm related to the consumable supply to the user (YES at step 426), the control proceeds to step 428. Otherwise (NO at step 426), the control proceeds to step 436.

At step 428, main control unit 300 gives an alarm using operation device 240. Here, information corresponding to the consumable supply in the near end or end state is displayed on display unit 244. At this time, the image forming process is stopped. As the image forming process is stopped, the user recognizes the information corresponding to the consumable supply displayed on display unit 244, and replenishes the consumable supply.

At step 430, main control unit 300 detects a signal from near end detecting unit 304. Main control unit 300 determines whether or not the consumable supply has been replenished, based on the signal detected from near end detecting unit 304. If neither the signal indicating the near end state nor the signal indicating the end state of consumable supply is detected from near end detecting unit 304, main control unit 300 determines that the consumable supply has been replenished.

At step 432, main control unit 300 determines whether or not the consumable supply has been replenished. If the consumable supply is determined to be replenished (YES at step 432), the control proceeds to step 434. Otherwise (NO at step 432), the control proceeds to step 428.

At step 434, main control unit 300 clears the alarm that has been given by operation device 240. Here, the consumable supply information corresponding to the consumable supply of which near end or end state is cancelled is erased. It is assumed that all alarms are cleared at this time.

At step 436, main control unit 300 determines whether or not the image forming process is completed. If it is determine that the image forming process is completed (YES at step 436), the control proceeds to step 438. Otherwise (NO at step 436), the control returns to step 422, and the image forming process is continued.

At step 438, main control unit 300 determines whether or not a request to turn off the power of MFP 100 is detected. If the power of MFP that is on is switched off by the user, it is determined that a request to turn off the power is detected. If it is determined that the request to turn the power off is detected (YES at step 438), the process ends. Otherwise (NO at step 438), the control returns to step 420 and waits until the next image forming process is detected. If it is detected that the request to turn the power off is detected (YES at step 438), main control unit 300 executes a shut-down process.

[Operation of Image Forming Apparatus]

The operation of MFP 100 based on the structure and flowchart as above will be described with reference to the timing charts of FIGS. 10 and 12 as well as the exemplary image of FIGS. 11 and 13. In the following description, it is assumed that only the near end signal or signals related to the remaining amount of consumable supply or supplies are output from near end detecting unit 304. As will be described in the following, in the present embodiment, in response to later one of 1) a change of the output of near end detecting unit 304 to a value indicating cancellation of the near end state or 2) completion of activation process of main control unit 300, the alarm given by alarm unit 250 is cleared.

—Operation when Replenishment of Consumable Supply is Completed During System Activation of Main Control Unit—

Assume that color toner (M) and the recording paper are in the near end state and MFP 100 is turned on. In such a situation, MFP 100 operates in the following manner.

Figure 10:
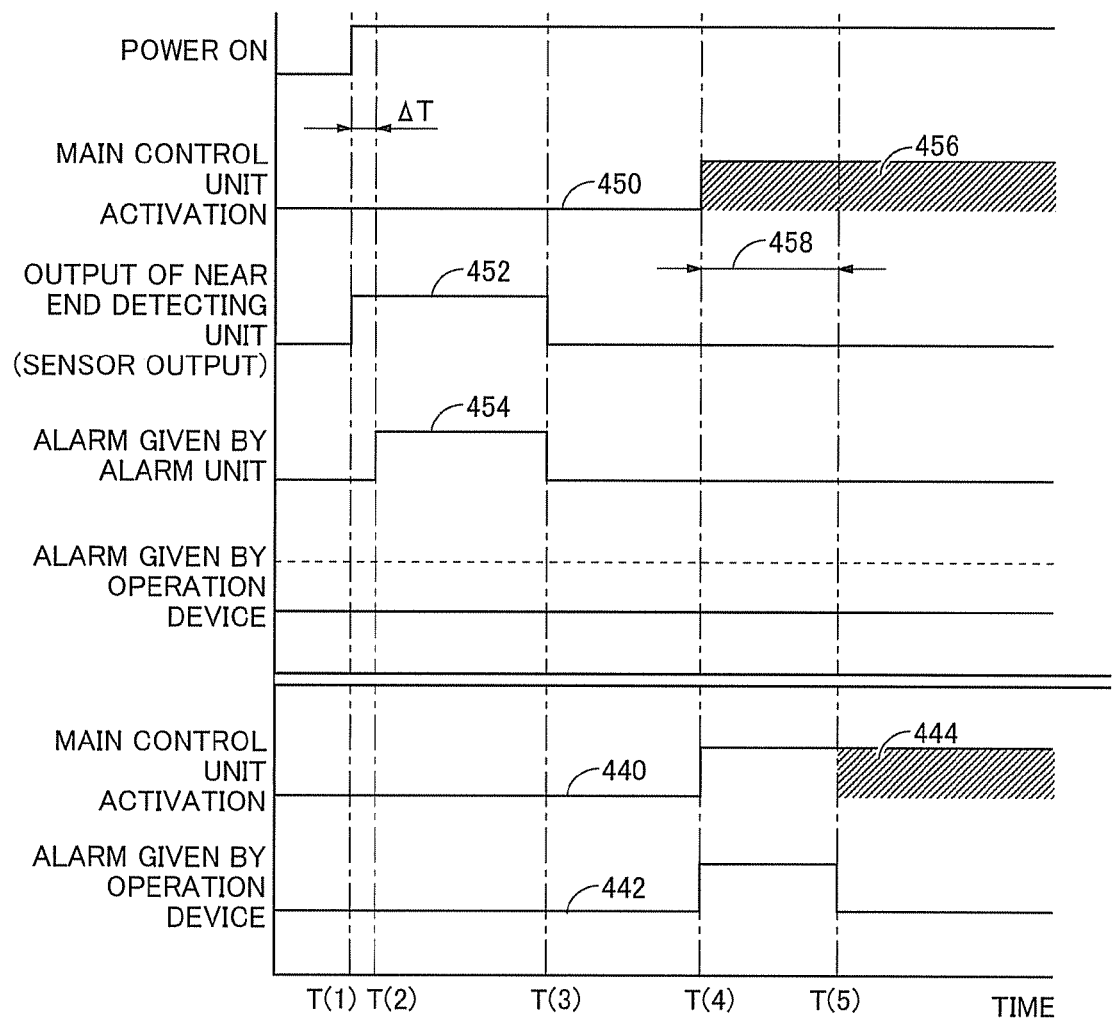
FIG. 10 is a timing chart when replenishment of a consumable supply is finished while the main control unit is being activated.

Referring to FIG. 10, when the power of MFP 100 is turned on at time point T(1), it is assumed that activation of the main control unit is completed at time point T(4), as represented by 440 and 450 in the graph. Conventionally, after the main control unit is fully activated at T(4) as indicated by 440 in the graph, an alarm is given by the operation device as indicated by 442 of the graph. Therefore, the alarm is given at time point T(4) at the earliest. Thereafter, the user notices the alarm and replenishes the consumable supply and, therefore, MFP 100 finally comes to be operable at a still later time point, for example, at T(5). The operable time period in which MFP 100 is usable is after the time point T(5), as represented by the hatched portion 444 in FIG. 10.

In contrast, in MFP 100 in accordance with the present embodiment, assuming that it takes only the time period ΔT to activate sub control unit 302 and the power of MFP 100 is turned on at T(1), activation of sub control unit 302 is completed after ΔT, at time point T(2) (where T(2)<T(4)). At time point T(1), power supply to the sensors of near end detecting unit 304 also starts simultaneously, and near end state of any consumable supply is detected. Then, as indicated by 452 in the graph, a signal output from near end detecting unit 304 rises to logic 1 from time point T(1). Since activation of sub control unit 302 has already been completed at T(2), sub control unit 302 immediately detects the output of near end detecting unit 304 being logic 1 and, as indicated by 454 in the graph, turns on an appropriate LED of alarm unit 250 at time T(2), to give an alarm of near end.

Assume that the user notices the alarm, starts replenishment of the consumable supply, and replenishment is finished at time point T(3). In FIG. 10, T(3)<T(4). Specifically, it is assumed that replenishment of consumable supply is completed, before activation of main control unit 300 is completed. Then, the output of near end detecting unit 304 falls to logic 0 at T(3), and at the same time the alarm given by sub control unit 302 is stopped.

As a result, by the time point T(4) when activation of main control unit 300 is completed, the near end state of consumable supply has already been cancelled. Therefore, MFP 100 is operable from time point T(4), as indicated by the hatched portion 456 in FIG. 10. Specifically, while the user could not start operation until time point T(5) (>T(4)) conventionally, the user can start operation earlier by the time period 458 between T(4) and T(5) shown in FIG. 10, in MFP 100.

In the following, program control transition here will be described. Sub control unit 302 detects an end signal of near end detecting unit 304 (step 340).

Assume that color toner (M) and recording paper as consumable supplies are in the near end state. Then, giving an alarm is determined to be necessary (YES at step 342), and an alarm is given by alarm unit 250 (step 344). Specifically, with reference to FIG. 10, at time point T(2), an alarm is given by alarm unit 250, simultaneously with the completion of activation of sub control unit 302 (since the cycle time of the program shown in the flowcharts of FIGS. 6 and 7 is negligibly short, alarm is given substantially simultaneously).

Figure 11:
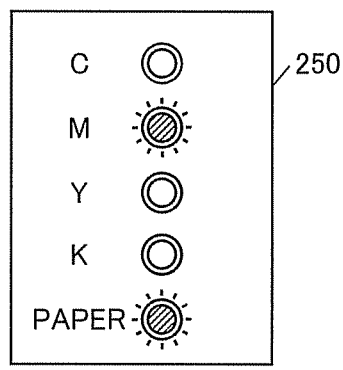
FIG. 11 shows an exemplary indication on an alarm unit of FIG. 5.

An exemplary indication by alarm unit 250 is as shown in FIG. 11. In the example of FIG. 11, of the LEDs on alarm unit 250, LED 254 corresponding to M ink and LED 260 corresponding to recording paper are lit.

The user, noticing the LEDs on alarm unit 250, exchanges the M ink toner bottle with a new toner bottle, and fills paper feed cassette 144 with sheets of recording paper. Here, such operations by the user end at time point T(3) before T(4) at which activation of main control unit 300 is completed.

With the activation complete signal from main control unit 300 not yet received (NO at step 346), the output from near end detecting unit 304 is read (step 348). If detection of near end signal related to the color toner (M) and the near end signal of recording paper stops and any other near end signal is not detected, it is determined that the consumable supplies have been replenished, while an alarm is being given (YES at step 350). Therefore, the alarm given by alarm unit 250 is cleared (step 352).

In FIG. 10, this situation is indicated at T(3), when the output of near end signal from the sensor of near end detecting unit 304 stops and, at the same time, the alarm given by alarm unit 250 is cleared.

Thereafter, at time point T(4), system activation of main control unit 300 is completed, and main control unit 300 transmits the activation complete signal (step 400). Then, sub control unit 302 determines that the activation complete signal is received from main control unit 300 (YES at step 346).

Since the alarm has been cleared (YES at step 354), sub control unit 302 transmits the image formation ready signal to main control unit 300 (step 362). Main control unit 300 detects the end signal of near end detecting unit 304 (step 402), determines that giving an alarm is unnecessary (NO at step 404), and then, receives the image formation ready signal from sub control unit 302 (YES at step 408). Since the alarm is not being given (NO at step 416), a message such as "READY TO COPY" is displayed on operation device 240, and the control waits until an image formation request is detected (step 420).

In this manner, in MFP 100 in accordance with the present embodiment, it is possible to replenish a consumable supply within the system activation time period. Thus, the image forming process can be executed in MFP 100 immediately after system activation.

—Operation when Replenishment of Consumable Supply is Completed after System Activation of Main Control Unit—

Even if replenishment of consumable supply starts during activation of main control unit 300, it may not be completed by the time when main control unit 300 is fully activated. In the following, the operation of MFP 100 in such a situation will be described, assuming that color toner (M) and the recording paper are detected to be in the near end state, at the time of activation of MFP 100.

Figure 12:
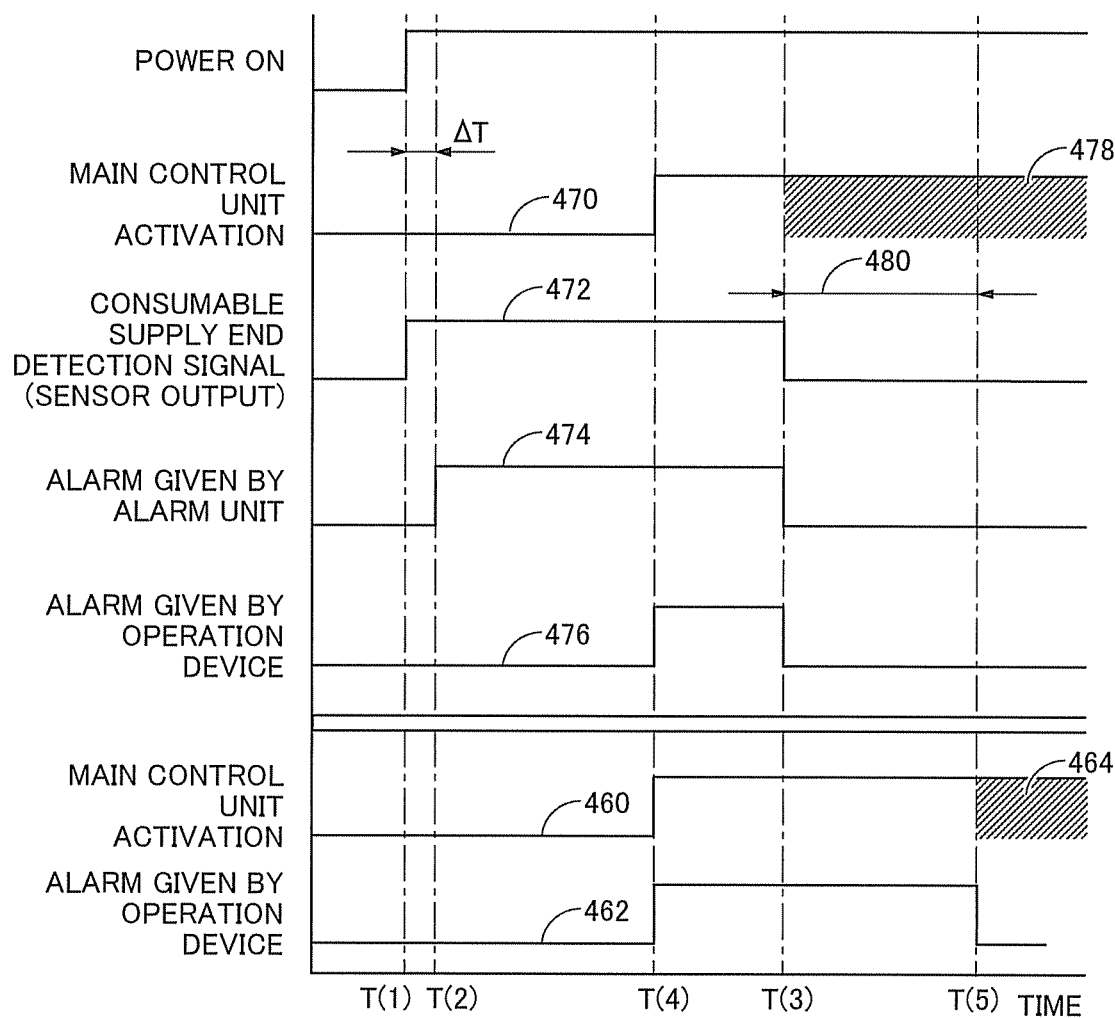
FIG. 12 is a timing chart when replenishment of a consumable supply is finished after the main control unit is activated.

Referring to FIG. 12, assume that the user turns on the power of MFP 100 at time point T(1). Conventionally, activation of the main control unit is completed at time point T(4), as indicated by 460 in the graph. Main control unit detects the near end state of color toner (M) and the recording paper at time point T(4) as indicated by 462 in the graph, and gives an alarm using the operation device. Therefore, the alarm is given at T(4) at the earliest. Assuming that the user finishes replenishment of color toner (M) and the recording paper at time point T(5). Then, image formation by the MFP is not possible until T(5).

In contrast, in MFP 100 in accordance with the present embodiment, the power of MFP 100 is turned on at time point T(1), and the activation process of main control unit 300 is completed at T(4) as indicated by 470 in the graph of FIG. 12. It is noted that when the power of MFP 100 is turned on at time point T(1), activation of sub control unit 302 is completed at the time point T(2) (=T(1)+$\Delta$T), earlier than the time point T(4). On the other hand, near end detecting unit 304 starts its operation almost simultaneously with power on of MFP 100 and detects that the color toner (M) and the recording paper are in the near end state, so that the output thereof assumes logic 1 substantially at time point T(1), as indicated by 472 in the graph of FIG. 12. Specifically, the near end signal is output from near end detecting unit 304.

Sub control unit 302 that has been completely activated at time point T(2) and has read the output of near end detecting unit 304 starts giving an alarm using alarm unit 250 substantially at time point T(2), in response to the occurrence of near end state. Noticing the alarm before completion of activation of main control unit 300, the user can start replenishment of consumable supply before completion of activation of main control unit 300.

Assume that activation of main control unit 300 is completed at time point T(4), as indicated by 470 in the graph. Then, an alarm indicating that consumable supply needs replenishment is displayed on operation device 240 by the control of main control unit 300.

When the user completes replenishment of the consumable supply at time point T(3) (where T(3)>T(4)), the output of near end detecting unit 304 attains to a value not indicating the near end state, as indicated by 472 in the graph. At the same time, the alarm displays by alarm unit 250 and by operation device 240 are cleared as indicated by 474 and 476 in the graph.

The operation of control blocks in MFP 100 during this period is as follows.

Sub control unit 302 reads the output of near end detecting unit 304 at time point T(2) (step 340). As a result, the color toner (M) and the recording paper are found to be in the near end state.

Giving an alarm is determined to be necessary (YES at steps 342), and an alarm is given using alarm unit 250 (step 344). Almost simultaneously with the completion of activation of sub control unit 302 at time point T(2), the alarm is given by alarm unit 250, as indicated by 474 in the graph of FIG. 12. Thus, it is possible to give an alarm to the user that the consumable supply must be replenished.

Noticing the LEDs on alarm unit 250, the user exchanges the M ink toner bottle with a new toner bottle, and fills paper feed cassette 144 with sheets of recording paper. Different from the example of FIG. 10, it is assumed here that these operations by the user end at the time point T(3) later than the time point T(4) when the activation of main control unit 300 is completed.

Here, sub control unit 302 has not yet received the activation complete signal from main control unit 300 (NO at step 346). Sub control unit 302 reads an output from near end detecting unit 304 (step 348). Since the output of near end detecting unit 304 indicates occurrence of the near end state, the determination at step 350 is negative, and the control returns from step 350 to step 346. The process at step 352 is not executed, and the alarm is continuously given by alarm unit 250.

When system activation of main control unit 300 is completed, the activation complete signal is transmitted from main control unit 300 to sub control unit 302 (step 400 of FIG. 8). This corresponds to completion of activation of main control unit 300 at time point T(4) of FIG. 12.

When the activation complete signal is received from main control unit 300 (YES at step 346), sub control unit 302 executes step 354 of FIG. 7. Here, the alarm is not yet cleared (NO at step 354), and therefore, an output from near end detecting unit 304 is read (step 356). The control waits until it is determined that the near end state of consumable supply has been canceled, through the processes of steps 356 and 358. If the determination at step 358 becomes positive, step 360 is executed, and all alarms given by alarm unit 250 are cleared.

As a result, referring to FIG. 12, the output of near end detecting unit 304 attains to a value indicating absence of near end state at time point T(3), as indicated by 472 in the graph. At the same time, the alarm by alarm unit 250 is cleared, as indicated by 474 in the graph.

At time point T(5), sub control unit 302 transmits the image formation ready signal to main control unit 300 (step 362).

On the other hand, main control unit 300 of which system activation is completed at time point T(4) transmits the activation complete signal to sub control unit 302 (step 400), and reads the output of near end detecting unit 304 (step 402).

Since it is indicated by the output of near end detecting unit 304 that the color toner (M) and the recording paper are in the near end state, giving an alarm is determined to be necessary (YES at step 404), and an alarm is given by operation device 240 (step 406). As a result, referring to FIG. 12, simultaneously with the completion of activation of main control unit 300 at time point T(4) as indicated by 470 in the graph, an alarm is given by operation device 240 as indicated by 476 in the graph.

Figure 13:
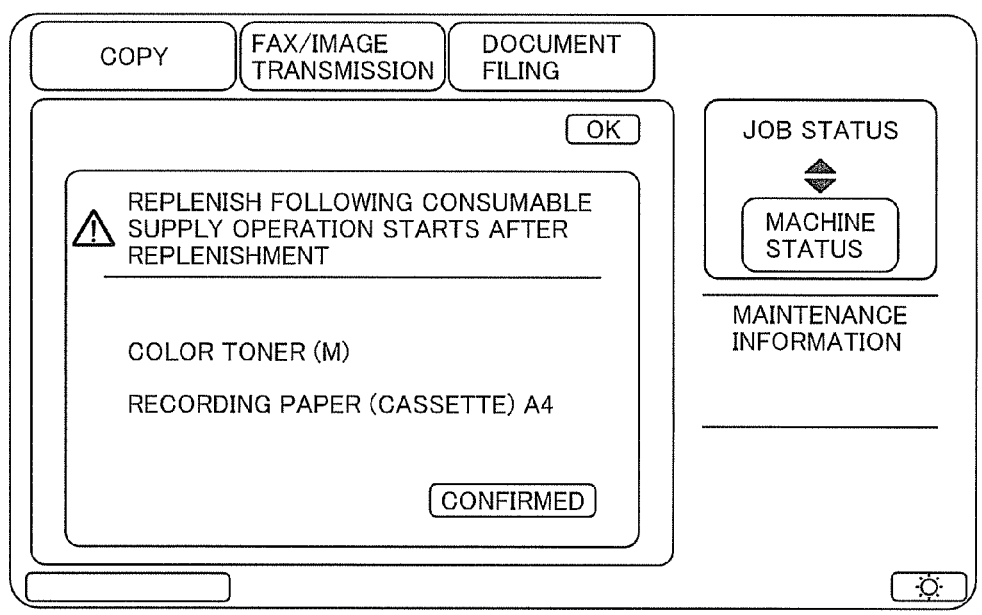
FIG. 13 shows an exemplary display on an operation device of FIG. 5.

FIG. 13 shows an exemplary image displayed on operation device 240 at this time. Referring to FIG. 13, on operation device 240, information urging replenishment of M ink and recording paper is displayed.

Noticing the operation device 240 (or LEDs on alarm unit 250), the user exchanges the M ink toner bottle with a new toner bottle, and fills paper feed cassette 144 with sheets of recording paper. Here, such operations by the user end at time point T(3) after T(4) at which activation of main control unit 300 is completed. Here, assuming that the replenishment operation was started after time point T(2) and before T(4), the time point T(3) is naturally earlier than T(5).

At time point T(3), main control unit 300 receives the image formation ready signal transmitted from sub control unit 302 (YES at step 408). If the image formation ready signal is received while the alarm is not yet cleared (YES at step 416), it is determined that replenishment of consumable supply has been completed, and the alarm given by operation device 240 is cleared (step 418).

As a result, as indicated by 472 in the graph of FIG. 12, the output of near end detecting unit 304 assumes a value indicating the absence of near end state at time point T(3), and as indicated by 476 in the graph, the alarm given by operation device 240 is cleared simultaneously. Then, as indicated by the hatched portion 478 corresponding to 470 in the graph, MFP 100 is ready to execute the image forming process, and the control waits for detection of an image formation request (step 420).

Since the consumable supply is replenished while the system is being activated in the manner as described above, the wait time for the user can be made shorter than when replenishment of consumable supply starts after the system is activated. More specifically, the image forming function of the MFP could conventionally be used only after time T(5) as indicated by the hatched portion 464 in FIG. 12, while the image forming function of MFP 100 in accordance with the present embodiment can be used from T(3), earlier by the time period 480 shown in FIG. 12.

It is usually the case that the image formation ready signal from sub control unit 302 is received by main control unit 300, with the alarm given by operation device 240 cleared. That the image formation ready signal is received with the alarm on operation device 240 cleared (NO at step 416) means that the alarm has been cleared at step 414. Nevertheless, the process steps 416 and 418 similar to the process of steps 412 and 414 are executed, from the following reason. Following the process of steps 410 to 414, main control unit 300 clears the alarm display on operation device 240. If replenishment of consumable supply is completed immediately after the determination of NO at step 412 and sub control unit 302 immediately transmits the image formation ready signal to main control unit 300, the determination at step 408 may be YES, making clearance at step 414 impossible. In case the alarm on operation device 240 is not cleared because of the timing gap between steps 414 and 408, the alarm display can be cleared by the process of step 418. In place of such an approach, a delay timer may be inserted before step 362.

—Operation when Replenishment of Consumable Supply Becomes Necessary During Image Formation—

After time point T(4) of FIG. 10 or after time point T(5) of FIG. 12, if the user selects the copy mode and presses the start button on operation unit 242 of operation device 240, it is determined that an image formation request is detected (YES at step 420).

From the start of image forming process corresponding to one image forming job (step 422) until the image forming process ends (NO at step 436), the output signal of near end detecting unit 304 is monitored, and if a signal indicating near end of a consumable supply or a signal indicating end of a consumable supply is detected from near end detecting unit 304, it is determined that replenishment of the consumable supply is necessary (YES at step 426).

In such a situation, the alarm is continuously given on operation device 240 (step 428) until the operation of replenishing the consumable supply by the user ends (NO at step 432). When the consumable supply replenishment operation by the user ends (YES at step 432), the alarm on operation device 240 is cleared (step 434), and the image forming process is continued (step 422).

As described above, in MFP 100 in accordance with the present embodiment, before system activation of main control unit 300 controlling the image forming process is completed, sub control unit 302 is activated, and if replenishment of consumable supply is determined to be necessary, the sub control unit causes the alarm unit to give an alarm to that effect. Therefore, it becomes possible for the user to replenish consumable supply while the system is being activated, and to execute the image forming process immediately after system activation. Therefore, even when image is to be formed by an image forming apparatus of which main power has been off and replenishment of consumable supply is necessary, the wait time resulting from replenishment of consumable supply, which would otherwise be added to the system activation time, can be saved.

<Modification>

In MFP 100 in accordance with the embodiment of the present invention, the alarm related to the consumable supply given during the image forming process after system activation of main control unit 300 is given to the user using only the operation device 240. The alarm to the user may be given additionally using alarm unit 250.

Further, the alarm given to the user is not limited to visual alarm, and an audio alarm (buzzer sound or the like) may be used.

In the embodiment described above, LED 252, 254, 256, 258 or 260 is turned on in response to the near end state of the consumable supply. The present invention, however, is not limited to such an embodiment. The LED may not be kept continuously on, but lit intermittently, that is, the LED may be flickered. Alternatively, if the consumable supply is in the near end state, the LED may be flickered, and if it is in the end state, the LED may be kept on. By such an approach, the near end state and the end state of consumable supply can be distinguished. Flickering and continuous lighting of LED may be reversed.

Second Embodiment

In the embodiment above, sub control unit 302 reads the output of near end detecting unit 304, and determines whether or not the near end state or the like of consumable supply has occurred. For this purpose, it is indispensable that near end detecting unit 304 becomes operable at an early stage after power-on and outputs a stable output. However, the output of near end detecting unit 304 immediately after power-on is possibly unstable. Unstable output of near end detecting unit 304 may lead to erroneous control of alarm unit 250 by sub control unit 302. Such a problem should be avoided.

Figure 14:
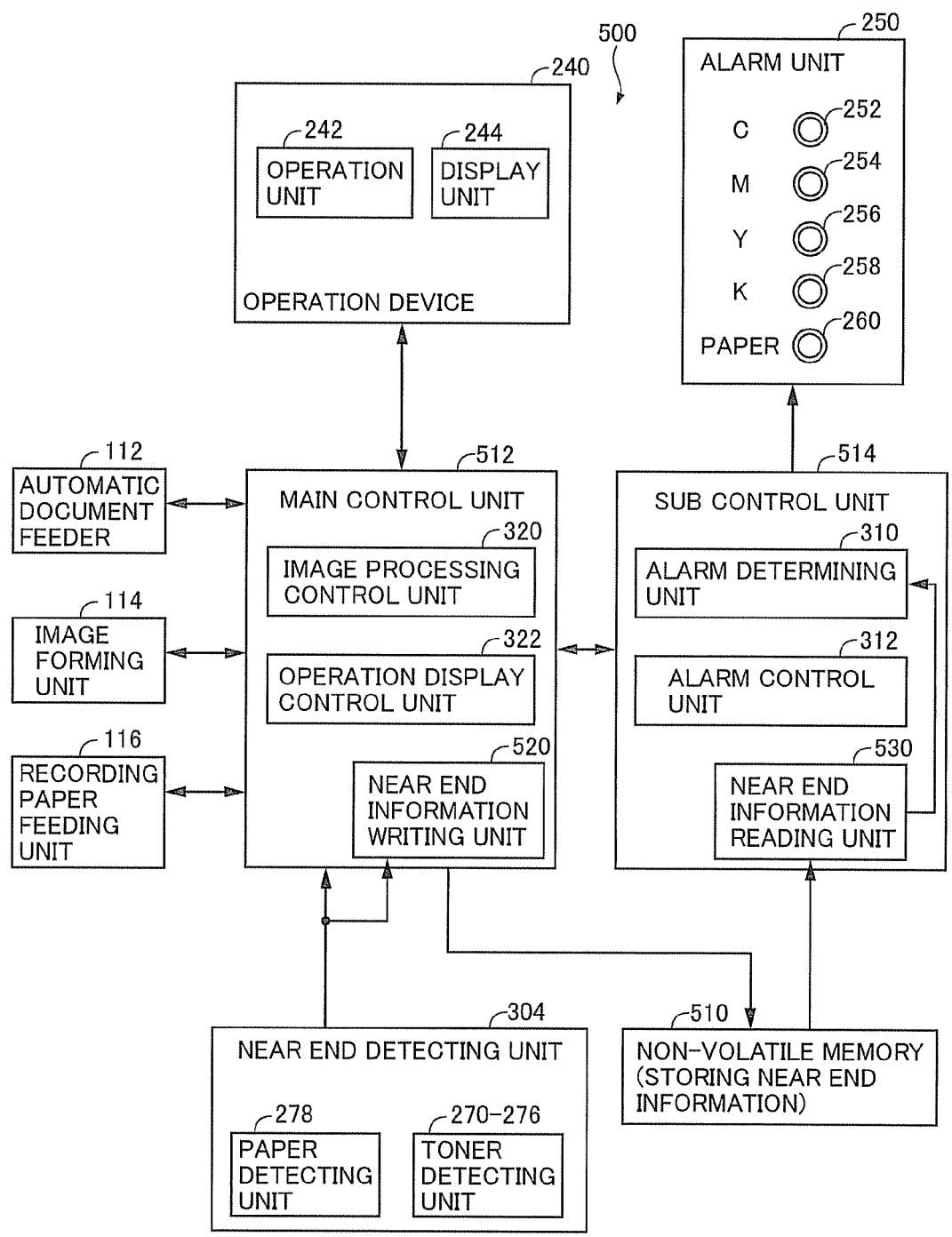
FIG. 14 is a block diagram of control blocks of the MFP in accordance with a second embodiment.

Referring to FIG. 14, the control block of MFP 500 in accordance with the second embodiment differs from that of the first embodiment in that it additionally includes a non-volatile memory 510 for storing near end information. It is necessary that non-volatile memory 510 becomes operable in a short period of time after power-on. Therefore, use of a hard disk or the like is impractical. A non-volatile semiconductor memory may be desirable as non-volatile memory 510. MFP 500 in accordance with the second embodiment further includes, in place of main control unit 300 and sub control unit 302 shown in FIG. 5, a main control unit 512 and a sub control unit 514 having similar configurations.

Main control unit 512 includes, in addition to the configuration of main control unit 300 shown in FIG. 5, a near end information writing unit 520 reading an output of near end detecting unit 304 at the time when power off is instructed, and writing the read output as near end information in non-volatile memory 510. Sub control unit 514 includes, in addition to the configuration of sub control unit 302 shown in FIG. 5, a near end information reading unit 530 reading the near end information from non-volatile memory 510 at the time of power on of MFP 500 and applying the read information to alarm determining unit 310.

Figure 15:
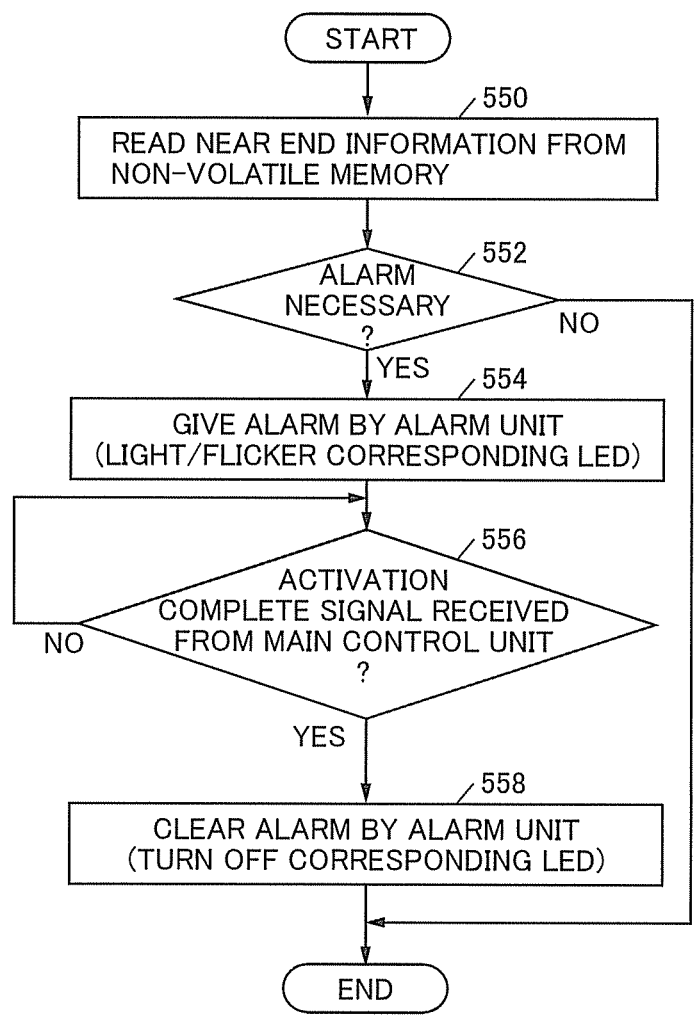
FIG. 15 is a flowchart representing a control structure of a program executed by the sub control unit shown in FIG. 14.

Referring to FIG. 15, the program realizing the function of sub control unit 514 has a control structure similar to that shown in FIG. 6, and execution starts when power is supplied to sub control unit 514 and the activation process of sub control unit 514 is completed. The program includes a step 550 of reading the near end information when the power of MFP 500 was turned off last time, from non-volatile memory 510. In the following step 552, sub control unit 514 determines, based on the near end information read at step 550, whether or not an alarm related to the near end state of consumable supply is necessary. If the determination at step 552 is negative, an alarm is unnecessary. Thus, execution of the program ends. If the determination at step 552 is positive, the control proceeds to step 554. At step 554, sub control unit 514 gives an alarm using alarm unit 250. Specifically, sub control unit 514 turns on one or more LEDs corresponding to consumable supply or supplies in the near end state among LEDs 252 to 260 of alarm unit 250.

At the following step 556, sub control unit 514 determines whether or not the activation complete signal indicating completion of system activation of MFP 500 has been received from main control unit 512. If the determination at step 556 is YES, the control proceeds to step 558. Otherwise, the control returns to step 556. Specifically, sub control unit 514 waits until the activation complete signal is received from main control unit 512. If sub control unit 514 receives the activation complete signal, the control proceeds to step 558, and at step 558, sub control unit 514 clears the alarm by alarm unit 250 and execution of the program ends.

Figure 16:
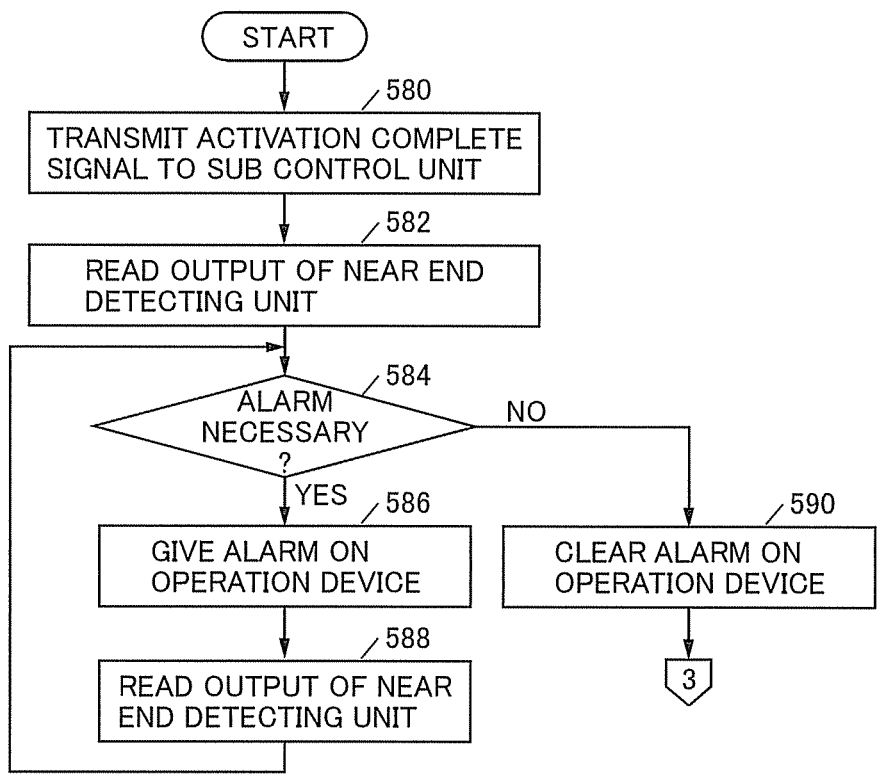
FIGS. 16 and 17 are flowcharts representing a control structure of a program executed by the main control unit shown in FIG. 14.

Referring to FIG. 16, the program executed by main control unit 512 has a control structure as will be described in the following. First, at step 580, main control unit 512 transmits the activation complete signal to sub control unit 514. By the activation complete signal, the operation of sub control unit 514 ends. Therefore, no matter whether the near end state has occurred or not, the alarm given by alarm unit 250 ends here.

At the following step 582, main control unit 512 reads the output of near end detecting unit 304. At the following step 584, main control unit 512 determines whether or not an alarm related to the consumable supply is necessary, based on the output from near end detecting unit 304. If the determination at step 584 is positive, the control proceeds to step 586. Otherwise, the control proceeds to step 590.

At step 586, main control unit 512 notifies the user of an alarm related to occurrence of near end state using operation device 240. At this time, main control unit 512 displays a message urging replenishment of the consumable supply that is in the near end state, on display unit 244. Thereafter, at step 588, main control unit 512 reads the output of near end detecting unit 304. Thereafter, the control returns to step 584.

Specifically, main control unit 512 repeats the process of steps 584 to 586 until it is found from the output of near end detecting unit that the near end state is cancelled. If the near end state is cancelled, the determination at step 584 becomes positive, and the control proceeds to step 590.

At step 590, the alarm given by operation device 240 is cleared. Thereafter, the control proceeds to step 420 of FIG. 17.

Figure 17:
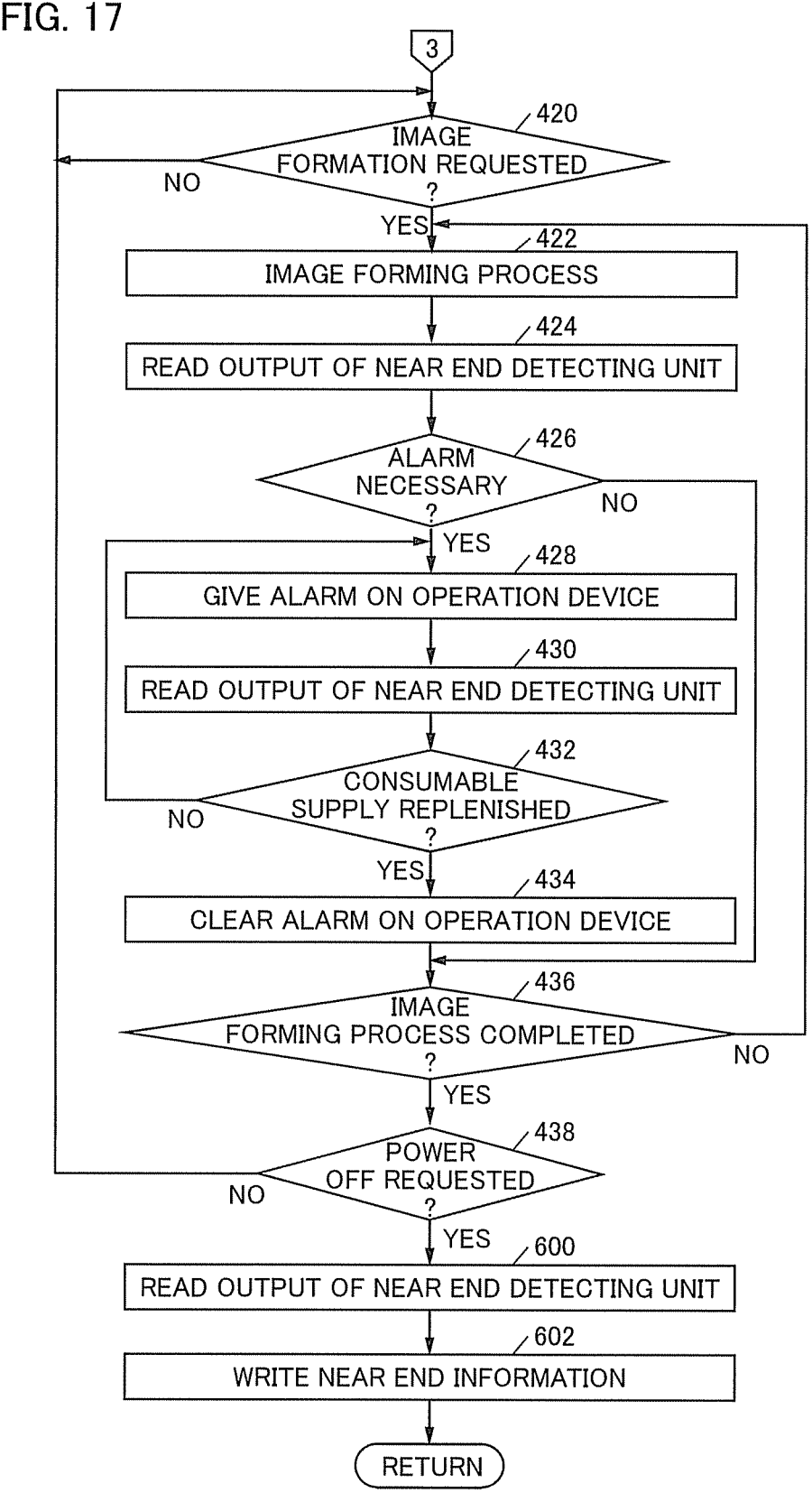

The control structure of the program shown in the flowchart of FIG. 17 is similar to that shown in FIG. 19. It is noted, however, that the flowchart of FIG. 17 does not include steps 416 and 418 shown in FIG. 9. Instead, the flowchart of FIG. 17 additionally includes: a step 600 executed if the determination at step 438 is positive, that is, if a power off instruction is made by the user, of reading the output of near end detecting unit 304; and a step 602, of writing the output of near end detecting unit 304 read at step 600 as the near end information in non-volatile memory 510 and ending execution of the program.

MFP 500 in accordance with the present embodiment operates in the following manner. When MFP 500 is powered on, activation process starts both in main control unit 512 and sub control unit 514. Sub control unit 514 is activated earlier than main control unit 512, and at step 550 of FIG. 15, it reads the near end information from non-volatile memory 510. The near end information represents the output of near end detecting unit 304 immediately preceding last power off of MFP 500, which was written by main control unit 512 to non-volatile memory 501 at steps 600 and 602 of FIG. 17, as will be described later.

If the near end information indicates the near end state of any consumable supply, the determination at step 552 of FIG. 15 becomes positive, so that an alarm is given using alarm unit 250 (step 554), and the alarm indication is continued until the activation complete signal is received from main control unit 512. Specifically, step 556 is repeated until the determination at step 556 becomes positive.

If the determination at step 556 becomes positive, step 558 is executed and the program ends. As a result, LEDs on alarm unit 250 are all turned off.

If the information read from non-volatile memory 510 does not indicate occurrence of the near end state (the determination at step 552 is negative), sub control unit performs no operation, and the process ends.

On the other hand, when the activation process is completed, main control unit 512 starts execution of the program having the control structure shown in FIGS. 16 and 17. Specifically, at step 580, the activation complete signal is transmitted to sub control unit 514. As a result, in sub control unit 514, the determination at step 556 of FIG. 15 becomes positive, so that execution of the program by sub control unit 514 ends and the alarm indication given by alarm unit 250 is cleared.

Further, main control unit 512 reads the output of near end detecting unit 304 at step 582. If the output value indicates occurrence of the near end state (the determination at step 584 is positive), main control unit 512 starts alarm display using operation device 240 at step 586. Thereafter, main control unit 512 repeatedly executes steps 588, 584 and 586, and thereby maintains the alarm display using operation device 240, until replenishment of consumable supply is finished. When replenishment of consumable supply is finished, the determination at step 584 becomes negative, so that alarm display using operation device 240 is cleared at step 590. Thereafter, the process following step 420 of FIG. 17, that is, the process of waiting for any image forming request and making necessary operations in response to the request, starts.

If a request to power off MFP 500 is received, the determination at step 438 of FIG. 17 becomes positive. Main control unit 512 reads the output of near end detecting unit 304 at step 600, writes the read value to non-volatile memory 510 at step 602, and the execution of the program ends.

In MFP 500 in accordance with the present embodiment, the near end information of near end detecting unit 304 at the time of power off of MFP 500 is written to non-volatile memory 510. When MFP 500 is activated, sub control unit 514 reads the near end information earlier than main control unit 512, and if the near end state has occurred, it gives an alarm to the user that a consumable supply is in the near end state, using alarm unit 250. As in the first embodiment, the user can start replenishing the consumable supply before activation of main control unit 512 is completed.

In the present embodiment, different from the first embodiment, when sub control unit 514 issues the near end alarm and thereafter receives the activation complete signal from main control unit 512, the alarm given by alarm unit 250 is terminated no matter whether replenishment of consumable supply is completed or not. The reason for this is that if replenishment of consumable supply is not yet completed by that time, main control unit continuously detects the state and gives an alarm display using operation device 240. After activation of main control unit 512, the user can recognize whether any consumable supply should be replenished or not, by viewing operation device 240. Therefore, sub control unit 514 monitors the output of near end detecting unit 304 and controls the indication given by alarm unit 250 in accordance with the monitored result only until activation of main control unit 512 is completed. The present embodiment can attain similar effects as those attained by the first embodiment.

In the second embodiment, after sub control unit 514 gives an alarm of near end until the activation complete signal from main control unit 512 is received, the alarm given by alarm unit 250 is maintained, no matter whether replenishment of the consumable supply is finished or not. Therefore, it is possible that the alarm is kept on even after the end of replenishment. The alarm, however, is after all cleared when activation of main control unit 512 is completed and, therefore, confusion by the user is unlikely.

According to the second embodiment, it is unnecessary to render near end detecting unit 304 operable immediately after power-on of MFP 500. Even if the output of near end detecting unit 304 is unstable after power-on, it does not affect detection of near end state. The operation of sub control unit 514 can be made independent from near end detecting unit 304. As a result, it becomes unnecessary to use a unit of particularly high response as near end detecting unit 304.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus, comprising:
   an image forming unit;
   a container member containing a consumable supply used by said image forming unit for forming an image;
   a signal output device rendered operable immediately after power-on of said image forming apparatus, outputting a detection signal selectively assuming first and second values depending on whether remaining amount of the consumable supply contained in said container member is lower than a prescribed value;
   a main control unit rendered operable after a prescribed activating process after power-on of said image forming apparatus, for controlling said image forming unit; and
   an alarm device, connected to receive said detection signal, capable of assuming a first state indicating an alarm and a second state not indicating an alarm, rendered operable before completion of the activating process of said main control unit, and assuming said first state in response to said detection signal having said first value; wherein
   said signal output device includes:
      a sensor rendered operable immediately after power-on of said image forming apparatus, provided in relation to said container member, for detecting remaining amount of the consumable supply contained in said container member, and selectively assuming said first and second values depending on whether said remaining amount is lower than said prescribed value or not,
a storage storing an output of said sensor immediately before power-off of said image forming apparatus, capable of retaining memory even when said image forming apparatus is powered off, and
a reading device reading, after said image forming apparatus is powered on, said output of said sensor stored in said storage, and applying the read output as said detection signal to said alarm device;
said alarm device includes:
an alarm indicating device assuming said first state or said second state in response to a control signal, and
a sub control unit connected to receive said detection signal, rendered operable before completion of the activating process of said main control unit after power-on of said image forming apparatus, for rendering said alarm indicating device to said first state or said second state in response to said detection signal having said first value or said second value, respectively; and
said sub control unit includes:
a first device reading said detection signal from said storage after power-on of said image forming apparatus, and based on its value, controlling the state of said alarm indicating device, and
a second device executing, after the process by said first device, if said alarm indicating device is in said first state and canceling condition is satisfied, a prescribed process to cancel alarm indication by said alarm indicating device.

2. The image forming apparatus according to claim 1, further comprising
an operation device connected to said main control unit, receiving an operation by a user and applying an operation signal to said main control unit, said operation device having a display device displaying information based on a display signal applied from said main control unit; wherein
said main control unit displays a message giving an alarm to the user urging replenishment of said consumable supply on said display device, in response to said detection signal having said first value when the main control unit is operable.

3. The image forming apparatus according to claim 2, wherein
said alarm indicating device includes
a light emitting device different from said display device, turned on or off in response to a control signal, and
said sub control unit turns on or off said light emitting device in response to said detection signal having said first value or said second value, respectively.

4. The image forming apparatus according to claim 3, wherein said sub control unit continuously keeps on said light emitting device if said detection signal has said first value.

5. The image forming apparatus according to claim 3, wherein said sub control intermittently turns on said light emitting device if said detection device has said first value.

6. The image forming apparatus according to claim 2, wherein said main control unit clears said message displayed on said display device in response to said detection signal making a transition from said first value to said second value, when said main control unit is operable.

7. The image forming apparatus according to claim 1, wherein said alarm device assumes said second state in response to said detection signal making a transition from said first value to said second value.

8. The image forming apparatus according to claim 1, wherein
said main control unit transmits an activation complete signal to said alarm device after completion of said activating process; and
said alarm device assumes said second state in response to either said detection signal making a transition from said first value to said second value or reception of said activation complete signal from said main control unit, whichever is later.

9. The image forming apparatus according to claim 1, wherein
said main control unit transmits an activation complete signal to said alarm device after completion of said activating process; and
said alarm device assumes said second state in response to reception of said activation complete signal from said main control unit.

10. The image forming apparatus according to claim 1, wherein:
said second device receives said signal output from said sensor as said detection signal, and executes said prescribed process if the value of said detection signal indicates said second value or if said activating process of said main control unit is completed.

11. A method of giving an alarm of near end state of a consumable supply in an image forming apparatus, wherein said image forming apparatus includes:
an image forming unit;
a container member containing a consumable supply used by said image forming unit for forming an image;
a signal output device rendered operable immediately after power-on of said image forming apparatus, outputting a detection signal selectively assuming first and second values depending on whether remaining amount of the consumable supply contained in said container member is lower than a prescribed value;
a main control unit rendered operable after a prescribed activating process after power-on of said image forming apparatus, for controlling said image forming unit; and
an alarm device, connected to receive said detection signal, capable of assuming a first state indicating an alarm and a second state not indicating an alarm, rendered operable before completion of the activating process of said main control unit, and assuming said first state in response to said detection signal having said first value; wherein
said signal output device includes:
a sensor rendered operable immediately after power-on of said image forming apparatus, provided in relation to said container member, for detecting remaining amount of the consumable supply contained in said container member, and selectively assuming said first and second values depending on whether said remaining amount is lower than said prescribed value or not,
a storage storing an output of said sensor immediately before power-off of said image forming apparatus, capable of retaining memory even when said image forming apparatus is powered off, and
a reading device reading, after said image forming apparatus is powered on, said output of said sensor stored in said storage, and applying the read output as said detection signal to said alarm device;
said main control unit transmits an activation complete signal to said alarm device after completion of said activating process;

said method comprising the steps of:

after power-on of said image forming apparatus, activating both said main control unit and said alarm device;

after power-on of said image forming apparatus, said alarm device reading an output of said signal output device; and after power-on of said image forming apparatus, setting said alarm device to said first state, in response to said detection signal having said first value; wherein said step of reading includes the steps of:

in response to an instruction to turn off the power of said image forming apparatus, turning off the power of said image forming apparatus after storing said output of said sensor in the storage, after power-on of said image forming apparatus, said reading device reading said output of said sensor stored in said storage and applying it as the detection signal to said alarm device, and before said activation complete signal is transmitted to said alarm device, said sensor outputting said signal as said detection signal to said alarm device.

* * * * *